(12) United States Patent
Iwasaki

(10) Patent No.: US 7,490,971 B2
(45) Date of Patent: Feb. 17, 2009

(54) PLANAR LIGHTING DEVICE

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/703,099

(22) Filed: Feb. 7, 2007

(65) Prior Publication Data
US 2007/0183137 A1 Aug. 9, 2007

(30) Foreign Application Priority Data
Feb. 7, 2006 (JP) ............................... 2006-029895

(51) Int. Cl.
*F21V 7/04* (2006.01)
*G09F 13/04* (2006.01)
(52) U.S. Cl. .................. 362/628; 362/97; 362/613; 362/616; 362/633
(58) Field of Classification Search ............ 362/607, 362/624, 633, 616, 634, 600, 611, 613, 614, 362/615, 628, 561, 26, 27, 97, 223, 225; 349/58, 60, 61, 62, 63, 67, 70; 385/129, 385/901
See application file for complete search history.

(56) References Cited

U.S. PATENT DOCUMENTS

| 4,945,350 A * | 7/1990 | Kawamura ............. 345/102 |
| 6,241,358 B1 | 6/2001 | Higuchi et al. |
| 6,561,663 B2 * | 5/2003 | Adachi et al. ............ 362/616 |
| 6,700,633 B2 * | 3/2004 | Cho ............................. 349/65 |
| 2003/0063456 A1 * | 4/2003 | Katahira ...................... 362/27 |
| 2006/0171171 A1 * | 8/2006 | Chiang ........................ 362/633 |

FOREIGN PATENT DOCUMENTS

| JP | 05-4133 | 1/1993 |
| JP | 05-249320 | 9/1993 |
| JP | 08-062426 | 3/1996 |
| JP | 09-304623 | 11/1997 |
| JP | 10-133027 | 5/1998 |
| JP | 11-288611 | 10/1999 |
| JP | 2001-042327 | 2/2001 |
| JP | 2005-234397 | 9/2005 |
| WO | WO 2005/080863 | 9/2005 |

* cited by examiner

*Primary Examiner*—Jong-Suk (James) Lee
*Assistant Examiner*—David R Crowe
(74) *Attorney, Agent, or Firm*—Sughrue Mion, PLLC

(57) ABSTRACT

The planar lighting device includes linear light sources, a light guide plate having a flat light exit surface, a rear surface and parallel grooves formed in the rear surface for accommodating the light sources, respectively, and a support member for supporting the light guide plate with the rear surface. A cross-section of the light guide plate has a rear surface profile including convex portions having the respective grooves and concave portions formed between adjacent grooves, and a thickness in each concave portion decreases from each groove toward either midpoint between adjacent grooves and is thinnest at the midpoint. A cross-section of the support member has a first surface profile of a first surface including a profile identical to a profile of each concave portion of the rear surface profile and a second surface of the support member is a flat surface.

18 Claims, 11 Drawing Sheets

PLANAR LIGHTING DEVICE

BACKGROUND OF THE INVENTION

The present invention relates to a planar lighting device used for indoor and outdoor illumination or used as a backlight for liquid crystal display panels, advertising panels, advertising towers, and other advertising signs, and comprising a light guide plate that diffuses light emitted from light sources and emits the diffused illuminating light from a light exit surface.

Generally, a liquid crystal display device has a backlight unit to illuminate its liquid crystal display (LCD) panel from the rear side thereof. Currently, large-sized liquid crystal display televisions predominantly use a backlight unit of a type that comprises cold cathode tubes provided behind the rear side of a liquid crystal display panel as light sources to illuminate the liquid crystal display panel (the type will be referred to below as "direct illumination type"; see JP 05-4133 U, for example). The cold cathode tubes are arranged in a housing with white inner walls serving as reflecting surfaces. To achieve a uniform light amount distribution with this type of backlight unit, however, the liquid crystal display panel needs to have a thickness of about 30 mm in a direction perpendicular to the panel as dictated by the principle.

Recent years have been seeing demands for thinner and larger liquid crystal displays and/or liquid crystal displays consuming less power. However, there was a limit to how thin a liquid crystal display could be made because of unevenness in light amount distribution that may occur when the thickness of a backlight unit of the direct illumination type mentioned above used therein had a thickness reduced to 10 mm or less.

As a backlight unit that is better suited to achieve reduction of the thickness, there is a backlight unit of a so-called tandem type that has units provided beside illuminating light sources, respectively (see JP 11-288611 A, for example). A conventional backlight unit of this type could be made somewhat thin to a certain extent by allowing light to be incident from lateral sides of the light guide plate. However, this conventional technology had a shortcoming of a lower light use efficiency than the backlight unit of the direct illumination type and therefore entails more power consumption in order to emit sufficient light for high brightness display.

Thus, light guide plates of various configurations have been proposed to achieve thinner and larger liquid crystal displays or liquid crystal displays consuming less power (see JP 09-304623 A, JP 08-62426 A, JP 10-133027 A, JP 05-249320 A, JP 2001-42327 A, and JP 2005-234397 A).

The area light source device (backlight unit) described in JP 09-304623 A is so formed that after fluorescent lamps are accommodated in a light guide plate, a reflective sheet is disposed on the rear surface of the light guide plate, and the light guide plate is provided on its light exit surface with layers consisting of a transmitted light amount correction sheet, a light diffusing plate, and a prism sheet.

The light guide plate has a substantially rectangular shape and is made of a resin into which fine particles functioning to diffuse illuminating light are dispersed. Also, the light guide plate has a flat upper surface that serves as the light exit surface. Further, grooves each having a U shape in cross-section are formed in the rear surface (surface opposite from the light exit surface) of the light guide plate to accommodate the respective fluorescent lamps. A light amount correction surface to facilitate the emission of illuminating light is formed on the light exit surface of the light guide plate, except in the areas where the fluorescent lamps are located just below.

Thus, JP 09-304623 A describes that the fine particles are mixed into the resin to form the light guide plate, and the emission of the illuminating light is facilitated by the light amount correction surface formed on a part or all of the light exit surface except in the areas where the fluorescent lamps are located just below, making it possible to reduce the total thickness and unnatural unevenness in brightness of the light emitted from the light guide plate.

JP 08-62426 A describes a light guide plate comprising a rectangular illumination surface, a groove with a rectangular cross-section that is formed at the center of the shorter sides of the rectangular illumination surface and in parallel with the longer sides thereof to accommodate a light source, and rear surfaces formed such that a plate thickness gradually decreases from the groove toward both lateral end surfaces on the longer sides to provide a backlight unit for a liquid crystal display device which enables reduction in size, weight, and thickness of a liquid crystal display device as well as reduction in manufacturing costs and power consumption without reducing the amount of illumination provided by the backlight unit (backlight amount).

JP 10-133027 A describes a light guide member (light guide plate) having a groove of a parabolic shape in cross-section taken along a width direction of the light guide member where a light source is arranged, the major axis of the parabolic shape lying in the direction of depth of the groove, in order to obtain a backlight unit that, with a high light use efficiency and, hence, high brightness, makes possible a liquid crystal display device with a thin frame and a reduced overall thickness.

JP 05-249320 A describes a light guide plate in which plate-shape light wave guide layers are laminated on symmetrically inclined high-reflectance layers so as to achieve successively increasing refractive indices and light emitted from light exit end surfaces of the reflective layers illuminates light diffusion layers brightly in order to keep brightness in a display surface of a display panel uniform and illuminate with high brightness. The recess for accommodating a light source is triangular in cross-section.

JP 2001-42327 A describes a large-area, high brightness rear illumination capable of highly uniform illumination by using light guide plates arranged side by side and a given number of linear light sources provided between the light guide plates to achieve an improved liquid crystal backlight unit employed in large-sized liquid crystal displays for wall-hung televisions.

The light guide plates described in the above references aim to achieve a thinner design, a larger design, and/or less power consumption for liquid crystal display devices. However, each of the light guide plates has at least one groove formed at the center thereof to accommodate a linear light source and the thickness of the plate preferably decreases from the groove toward or the end surfaces or surfaces to achieve a thin design.

The light guide plate described in JP 09-304623 A has a light amount correction surface, such as a rough surface or a microprism surface, formed on the light exit surface except in the areas where light sources (fluorescent lamps) are provided just below, to facilitate the emission of the illuminating light incident on the light exit surface at an angle not less than a critical angle. However, this configuration is provided only a limited measure of increase in brightness of illuminating light emitted from the light guide plate provided with the light amount correction surface as compared with illuminating light emitted from a light guide plate without a light amount correction surface. Thus, the light guide plate described in JP 09-304623 A has a shortcoming that the improvement in brightness of illuminating light achieved by providing the light amount correction surface is not significant, the use efficiency of the light emitted from the light sources is low, and the diffusion of the light from the light sources is inadequate, failing to emit uniform and bright enough light from the light exit surface.

The light guide plate described in JP 09-304623 A has the light sources, i.e., fluorescent lamps, fitted in the grooves each with a circular cross-section, whereby the brightness still peaked at the locations above the light sources. Thus, for this light guide plate to be used as an area light source device, unnatural unevenness in brightness observed at the light exit surface must be eliminated using, for example, a transmitted light amount correction sheet, a light diffusing plate, and a prism sheet provided on the side of the light guide plate closer to the light exit surface. This, however, results in increased costs for the manufacture of the area light source device.

With the backlight unit described in JP 08-62426 A, space beneath the inclined rear surfaces of the light guide plate is used to house parts mounted on electronic circuit boards, thereby to provide a low-cost, low power-consumption backlight unit and achieve a smaller, thinner, and lighter design of a liquid crystal display device. No consideration, however, is given to unevenness in brightness of the illuminating light emitted from the light exit surface of the light guide plate.

The backlight unit for a liquid crystal display device described in JP 10-133027 A has the groove with the parabolic cross-section formed in the light guide member (light guide plate) to admit light to the light guide member such that the diffusion in the light guide plate is substantially uniform in order to enhance the light use efficiency. No consideration, however, is given to unevenness of the light emitted from the light exit surface of the light guide member.

The light guide plate described in JP 05-249320 A has a complicated structure with the laminated light wave guide plates to reduce attenuation of brightness as compared with the prior art and achieve uniform brightness, thereby offering enhanced illumination effects. However, the proposed light guide plate has a drawback of increased manufacturing costs.

With the light guide plate described in JP 2001-042327 A, the brightness rises in areas located just above the linear light sources. Therefore, light transmittance inhibiting patterns must be formed to restrict the transmittance of the light from the linear light sources. Further, since the light emitted from the linear light sources travels inside the light guide plate from one end thereof to the other in a plane direction parallel to a light exit surface of the light guide plate, the amount of light attenuates gradually. Thus, the light guide plate described in JP 2001-042327 A can not adequately attain an improved level of brightness.

To solve the above problems, the inventors of the present invention have proposed a planar lighting device using a light guide plate as described in JP 2005-234397 A. The light guide plate is transparent and comprises a rectangular light exit surface, a thick portion positioned at substantially a center of the rectangular light exit surface in parallel with a side of the rectangular light exit surface, thin edge portions formed parallel to the thick portion, and inclined rear portions having a parallel groove formed substantially at a center of the thick portion parallel to the side to accommodate a rod-shaped light source. The inclined rear portions are symmetrical with respect to a plane including the central axis of the rod-shaped light source and perpendicular to the rectangular light exit surface. The inclined rear portions have a thickness that decreases from the thick portion toward the thin edge portions in a direction perpendicular to the side of the rectangular light exit surface to form inclined surfaces on both sides of the parallel groove. The parallel groove narrows toward the rectangular light exit surface until the parallel groove forms an end point symmetrically with respect to a center line of the parallel groove perpendicular to the rectangular light exit surface in a cross-sectional shape of the parallel groove in the direction perpendicular to the rectangular light exit surface in accordance with a ratio of a peak value of illuminance or brightness of light emitted from the rod-shaped light source accommodated in the parallel groove measured at a first portion of the rectangular light exit surface corresponding to the parallel groove to an average value of the illuminance or brightness of the emitted light measured at second portions corresponding to the inclined rear portions.

SUMMARY OF THE INVENTION

Using the light guide plate described in JP 2005-234397 A, a thin, lightweight planar lighting device can be manufactured at lower costs. Further, a planar lighting device thus obtained is capable of emitting high-brightness illuminating light with enhanced light use efficiency and a highly uniform brightness, featuring a large illumination surface as well.

With a light guide plate comprising a parallel groove to accommodate a light source and inclined rear surfaces on the side opposite to the light exit surface, the surface (rear surface) comprising the parallel groove and inclined rear surfaces has a concave and convex configuration. If a convex portion of the rear surface of the light guide plate should come in contact with some other member and break and/or damage part of the light guide plate, this may cause unevenness in brightness. In case of disposing reflective members to the inclined rear surfaces of the light guide plate, unevenness in brightness may also occur if the reflective members should detach from the inclined surfaces.

Further, when a light guide plate comprising a parallel groove to accommodate a light source and inclined surfaces on the surface opposite from the light exit surface is used as a unit and two or more of the units are connected to form a large-sized light guide plate, the large-sized light guide plate thus formed may have warped. Even though the light guide plate is flat and free from a warp at the time of manufacture, it may develop a warp because of, for example, the heat generated by the light sources and/or humidity. A greater warp may be developed when a light guide plate has a plurality of light sources accommodated in the grooves.

A light guide plate is even more liable to warp in cases where a planar lighting device is used as a backlight unit for indoor/outdoor illuminating devices, advertising signs, and the like, because in such applications, the light guide plate may be so installed that its light exit surface faces downward. If a light guide plate has a warp, the light emitted from the light exit surface thereof exhibits unevenness in brightness.

One may consider providing discrete support blocks to brace individual inclined surfaces of the light guide plate having a rear surface with a concave and convex configuration to render the whole planar lighting device as lightweight as possible. However, it requires considerable time and steps to arrange a number of support blocks in order to keep the light exit surface flat without causing unevenness in brightness and illumination.

It is an object of the present invention to eliminate the problems arising from the prior art technologies described above, and to provide a planar lighting device that has a simple structure which can eliminate the possibility of the light guide plate coming in contact with some other member, bring a reflective member into intimate contact with inclined surfaces of the light guide plate and permit designing with larger dimensions and emission of uniform, high-brightness light.

Another object of the present invention is to eliminate the problems due to prior art technologies described above and to provide a planar lighting device of a simple structure that can inhibit the light guide plate from warping, permits designing with larger dimensions, and is capable of emitting uniform, high-brightness light.

In order to solve the above problems and attain the object and another object described above, the present invention provides a planar lighting device comprising: linear light sources arranged in parallel to each other; a light guide plate comprising a flat light exit surface, a rear surface opposite to the light exit surface and parallel grooves formed in the rear surface, for accommodating the linear light sources, respectively, wherein a cross-section of the light guide plate perpendicular to the parallel grooves has a rear surface profile of the rear surface such that convex portions are formed at respective portions where the parallel grooves are formed, while concave portions are formed between adjacent parallel grooves, and a thickness of the light guide plate in each concave portion decreases from each parallel groove toward either midpoint between adjacent parallel grooves and is thinnest at the midpoint; and a support member arranged in a side of the rear surface of the light guide plate, for supporting the light guide plate, wherein the support member has a first surface facing the rear surface of the light guide plate and a second surface opposite to the first surface, and wherein a cross-section of the support member perpendicular to the parallel grooves of the light guide plate has a first surface profile on a side of the support member facing the light guide plate such that a profile of a portion facing each convex portion of the rear surface profile of the light guide plate is identical to a profile of each concave portion of the rear surface profile of the light guide plate, while the second surface of the support member is a flat surface.

Preferably, the support member has concave and convex portions formed on the first surface of the support member, and supports the light guide plate such that the concave and convex portions formed on the first surface of the support member fit to the respective convex and concave portions formed on the rear surface of the light guide plate.

Preferably, each of the rear surface profile and the first surface profile is formed that adjacent concave portions are symmetrical with respect to a convex portion formed between the first surface profile and that adjacent convex portions are symmetrical with respect to a concave portion formed between adjacent convex portions.

Further, the rear surface profile and the first surface profile are preferably symmetrical with respect to a midpoint between the adjacent concave portions and a midpoint between convex portions.

Preferably, the support member is formed of a same material as the light guide plate.

Preferably, the support member further has a reflective film on the first surface facing the light guide plate.

Preferably, the light guide plate comprises a plurality of individual light guide plates, each individual light guide plate comprising: an individual rectangular light exit surface; a parallel groove formed on a surface opposite to the individual rectangular light exit surface, for accommodate a linear light source; a thick portion positioned at substantially a central portion of the individual rectangular light exit surface in parallel with an axis of the linear light source; thin end portions formed in parallel with the thick portion and at both sides of the thick portion; and inclined rear portions forming inclined surfaces at both side of the parallel groove, wherein the inclined rear portions are symmetrical with respect to a plane including an axis of the linear light source and being perpendicular to the individual rectangular light exit surface, and a thickness of the inclined rear portions decrease in a direction perpendicular to the linear light source toward the thin end portions at both ends of the individual light guide plate, wherein the parallel groove is formed at substantially a center of the thick portion, and wherein two thin end portions of adjacent individual light guide plates are connected to each other, and the individual rectangular light exit surfaces of the plurality of individual light guide plates thus connected lie on an identical plane to form the light exit surface.

Preferably, the support member comprises a plurality of individual support members (concave and convex member), each individual support member has an identical configuration to a configuration of the individual light guide plate, and the individual rectangular light exit surface of the individual light guide plate serves an individual flat surface of the individual support member, and two thin end portions of adjacent individual support members are connected to each other, and individual flat surfaces of the plurality of individual support members thus connected all lie on an identical plane to form the flat surface of the support member, and the light guide plate and the support member are disposed such that respective inclined surfaces of the light guide plate and the support member face each other and the parallel grooves of one of the light guide plate and the support member face the thin end portions of the other of the light guide plate and the support member, respectively.

Further, the present invention provides a planar lighting device comprising: linear light sources; a light guide plate having a light exit surface and a rear surface, diffusing incident light from said linear light sources and emitting the diffused light from a light exit surface; and a support member arranged in a side of the rear surface of the light guide plate, and supporting the light guide plate, wherein the light guide plate including a plurality of individual light guide plates, each individual light guide plate comprising: an individual rectangular light exit surface; a parallel groove formed on a surface opposite to the individual rectangular light exit surface, for accommodate a linear light source; a thick portion positioned at substantially a central portion of the individual rectangular light exit surface in parallel with an axis of the linear light source; thin end portions formed in parallel with the thick portion and at both sides of the thick portion; and inclined rear portions forming inclined surfaces at both side of the parallel groove, wherein the inclined rear portions are symmetrical with respect to a plane including an axis of the linear light source and being perpendicular to the individual rectangular light exit surface, and a thickness of the inclined rear portions decrease in a direction perpendicular to the linear light source toward the thin end portions at both ends of the individual light guide plate, wherein the parallel groove is formed at substantially a center of the thick portion, and wherein two adjacent individual light guide plates are connected to each other at their thin end portions, and the individual light exit surfaces of the plurality of individual light guide plates thus connected lie on an identical plane to form the light exit surface, and wherein the support member comprises a plurality of individual support members (concave and convex member), each individual support member has an identical configuration to a configuration of the individual light guide plate, and the individual rectangular light exit surface of the individual light guide plate serves an individual flat surface of the individual support member, and two thin end portions of adjacent individual support members are connected to each other, and individual flat surfaces of the plurality of individual support members thus connected all lie on an identical plane to form the flat surface of the support member, and the light guide plate and the support member are disposed such that respective inclined surfaces of the light guide plate and the support member face each other and the parallel grooves of one of the light guide plate and the support member face the thin end portions of the other of the light guide plate and the support member, respectively.

Preferably, concave and convex configurations defined by the inclined surfaces of the support member fit with convex and concave configurations defined by the inclined surfaces of the light guide plate.

Preferably, the inclined surfaces of the individual light guide plate are symmetrical in a plane perpendicular to the axis of the linear light source with respect to a midpoint between the center of the individual light guide plate in a direction parallel to the light exit surface and either of the thin end portions.

Preferably, the support member is formed of a same material as the light guide plate.

Preferably, the support member further has a reflective film on its front surface facing the light guide plate.

Preferably, the planar lighting device further comprises at least one optical member covering the light exit surface on a side of the light exit surface of the light guide plate. The at least one optical member unit preferably comprises at least one of a prism sheet, a diffusion sheet, and a transmittance adjusting member.

Preferably, the support member further comprises parallel grooves formed in the convex portions of the support member parallel to each other, respectively, and each parallel groove of the support member has substantially a same shape as the parallel groove formed in each of the convex portions of the light guide plate.

Preferably, the planar lighting device further comprises reflectors embedded in the parallel grooves of the support member, respectively.

Preferably, the planar lighting device further comprises linear light sources accommodated in the parallel grooves of the support member, respectively, wherein the flat surface of the support member serves as a second light exit surface so that illuminating light emitted from the linear light sources and entering the support member is emitted from the second light exit surface of the support member.

Preferably, the planar lighting device further comprises at least one second optical member covering the second light exit surface on a side of the second light exit surface of the support member.

The at least one second optical member preferably comprises at least one of a prism sheet, a diffusion sheet, and a transmittance adjusting member.

Preferably, the planar lighting device further comprises fixing members for engaging and fastening the light guide plate to the support member.

The fixing members are preferably screws or rivets fitted into the light guide plate and the support member.

The fixing members preferably have a refractive index of from 90% to 110% of the refractive index of the light guide plate. More preferably, the fixing members have a refractive index of from 95% to 110% of the refractive index of the light guide plate. Still more preferably, the fixing members have substantially a same refractive index as the light guide plate.

Preferably, the planar lighting device further comprises holding members disposed on the flat surface of the support member.

Further, the support member is preferably manufactured under same manufacturing conditions as the light guide plate.

According to the present invention, it is possible to provide a planar lighting device that emits uniform, high-brightness illuminating light and permits prevention of breaks that may possibly be caused to a surface of the light guide plate opposite from the light exit surface as that surface touches some other member by providing the rear surface profile of the light guide plate and the top surface profile of the support member facing the light guide plate such that these profiles have same configurations with each other at given sections thereof and disposing the concave portions of one of these profiles on the convex portions of the other.

Further, the light guide plate and the support member can be disposed in close contact with each other, and the light guide plate can be supported with an enhanced sturdiness by the rear surface profile of the light guide plate and the top surface profile of the support member that are symmetrical with respect to a midpoint between adjacent concave and convex portions.

According to the present invention, the concave and convex portions of the light guide plate and the support member have the same configurations and are disposed on each other such that the concave portions of one of the light guide plate and the support member engage with the convex portions of the other and that the light guide plate and the support member are fastened to each other by means of fixing members. Thus, if a force to deform the light guide plate is generated by heat from light sources, a counterforce will be produced in the support member to deform the support member in a direction opposite to that in which the light guide plate deforms. Stated otherwise, the force thus produced in the support member acts to inhibit the light guide plate from warping. Thus, it is possible to provide a planar lighting device of which the light guide plate can be inhibited from warping and that can emit uniform light with greatly reduced unevenness in brightness.

Further, the light guide plate and the support member can be disposed in close contact with each other by providing the rear surface profile of the light guide plate and the top surface profile of the support member that are symmetrical with respect to a midpoint between adjacent concave and convex portions. Thus, the light guide plate can be supported with an enhanced sturdiness and its warpage can be inhibited.

Still further, the provision of the reflective film on the surface of the support member facing the light guide plate permits a simplified structure of the planar lighting device.

Further still, in an embodiment of the present invention in which the support member has the parallel grooves, light can be reflected with an enhanced efficiency by fitting a reflector in each parallel groove.

Other features and advantages of the present invention will become readily apparent upon reading the following detailed description of exemplary embodiments with reference to the accompanying drawings.

DETAILED DESCRIPTION OF THE INVENTION

The planar lighting device according to the present invention will now be described in detail.

Figure 1:
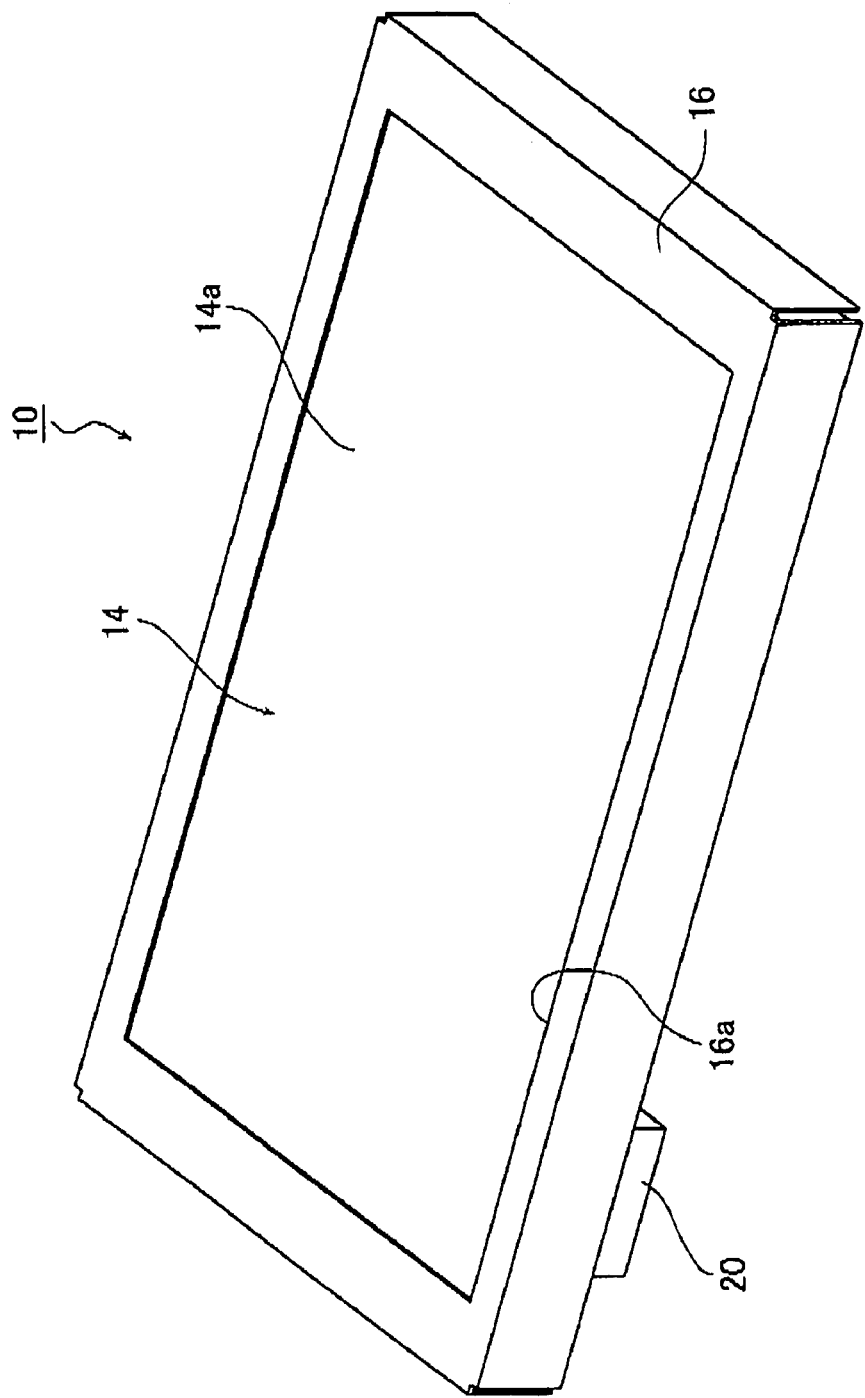
FIG. 1 is a schematic perspective view illustrating the external appearance of an embodiment of the planar lighting device of the present invention as seen from the light exit surface.
Figure 2A:
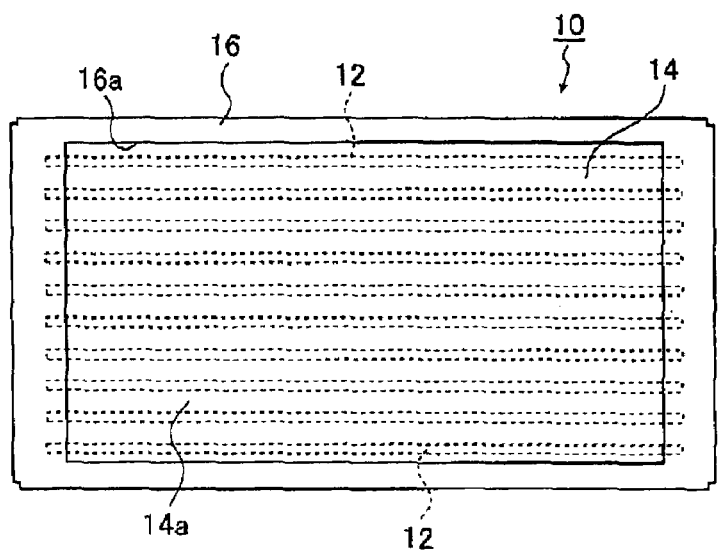
FIGS. 2A, 2B, 2C and 2D are a top plan view, a longitudinal side view, a transverse side view, and a rear view, respectively, of the planar lighting device illustrated in FIG. 1.
Figure 2C:
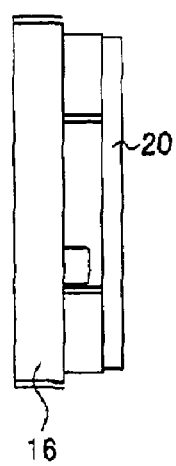
Figure 2B:
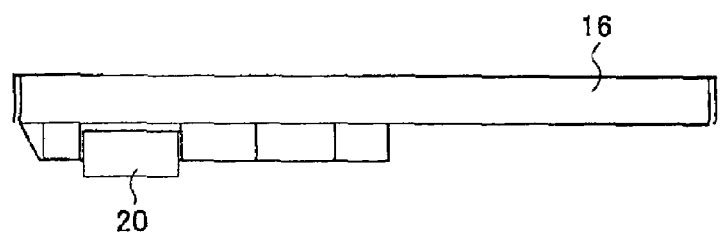
Figure 2D:
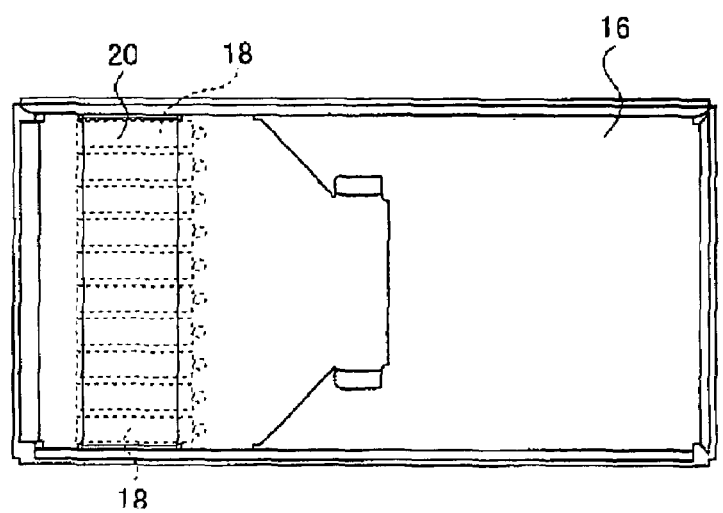
Figure 3:
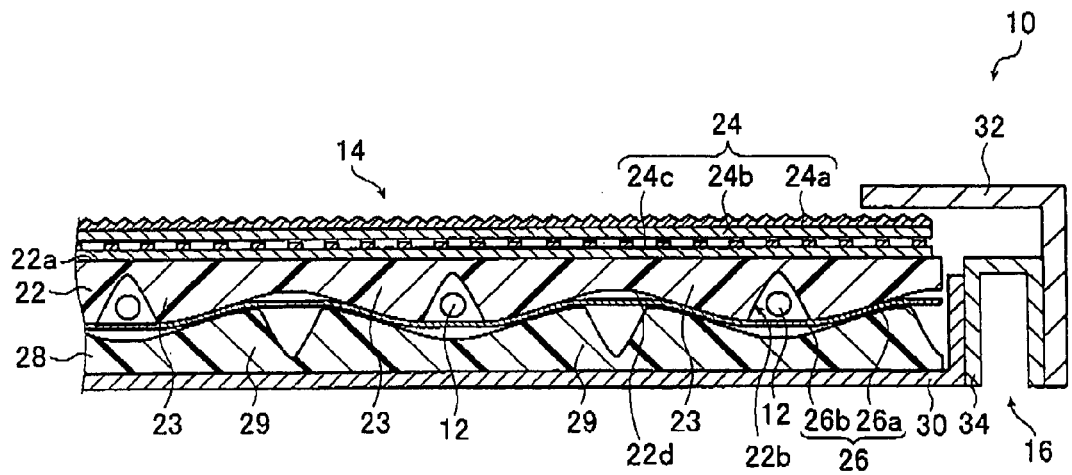
FIG. 3 is a partial cross-section of an embodiment of the planar lighting device illustrated in FIG. 1.

FIG. 1 is a schematic perspective view of an embodiment of the planar lighting device according to the present invention and illustrates its external appearances as seen from the light exit surface. FIGS. 2A, 2B, 2C and 2D are a top plan view, a longitudinal side view, a transverse side view, and a rear view, respectively, of the planar lighting device illustrated in FIG. 1. FIG. 3 is a partial cross-section of an embodiment of the planar lighting device illustrated in FIG. 1. These and other drawings referred to below are enlarged in a direction of thickness of the planar lighting device for ease of understanding.

As illustrated in FIG. 1 and FIGS. 2A to 2D, a planar lighting device 10 comprises a main body of lighting device 14, a housing 16, an inverter casing 20, and a power supply 38. The main body of lighting device 14 comprises linear light sources 12 and emits uniform light from a rectangular light exit surface 14a. The housing 16 accommodates the main body of lighting device 14 therein and is formed with a rectangular opening 16a on a side thereof closer to the light exit surface 14a (top surface). The inverter casing 20 is provided on a side (rear surface side) of the housing 16 opposite from the light exit surface 14a to accommodate inverter units 18 used to turn on the respective linear light sources 12. The power supply 38 (see FIG. 6) is connected to the inverter units 18 accommodated in the inverter casing 20 to turn on the individual linear light sources 12.

Figure 4:
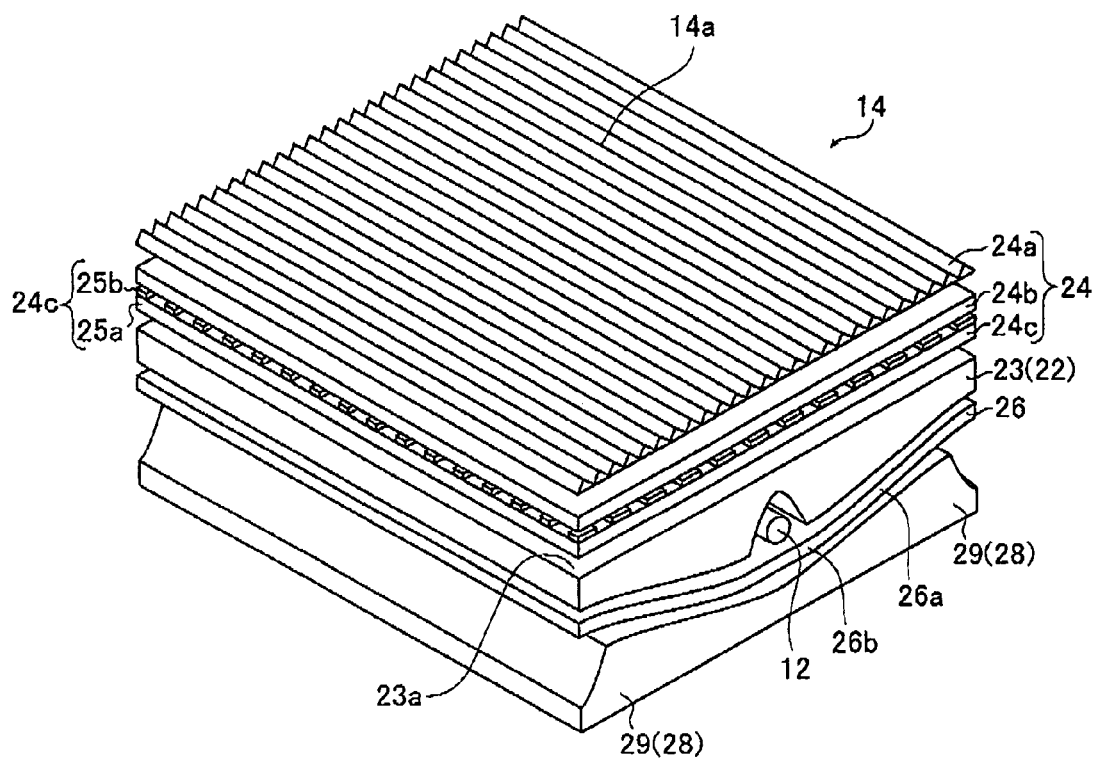
FIG. 4 is a schematic perspective view illustrating a main body of lighting device that corresponds to one unit light guide plate used in the planar lighting device illustrated in FIG. 3.
Figure 5A:
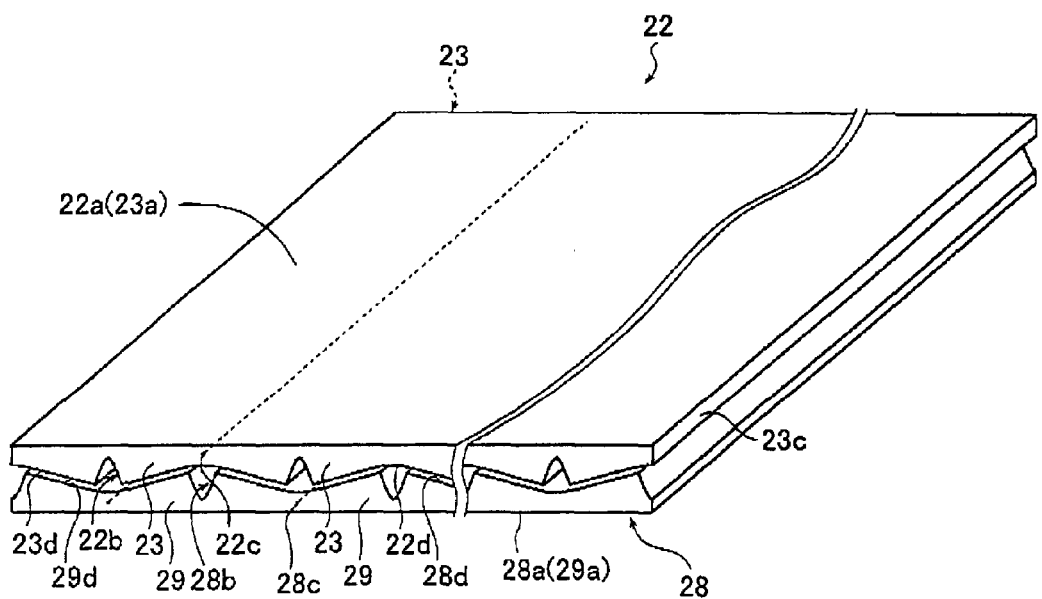
FIG. 5A is a schematic perspective view of the light guide plate used in the planar lighting device illustrated in FIG. 3.

The main body of lighting device 14 is provided to emit uniform light from the rectangular light exit surface 14a. As illustrated in FIG. 3, FIG. 4, and FIG. 5A, the main body of lighting device 14 essentially comprises the linear light sources 12, a light guide plate 22, an optical member unit 24, a reflective member 26, and a support member 28. The light guide plate 22 comprises a rectangular light exit surface 22a provided on a side thereof closer to the light exit surface 14a, parallel grooves 22b formed on a rear side thereof, i.e., the reverse side, of the light guide plate 22, to accommodate the respective linear light sources 12, and thinnest portions 22c formed between adjacent parallel grooves 22b, where the distance between the light exit surface 22a and the rear side is smallest. The optical member unit 24 is provided on the side of the light guide plate 22 facing the light exit surface 22a and has a rectangular plane that forms the rectangular light exit surface 14a. The reflective member 26 is provided across a rear surface 22d of the light guide plate 22. The support member 28 is provided on a side of the reflective member 26 opposite from the light guide plate 22 to support the light guide plate 22. The support member 28 has a configuration that is a reverse of that of the light guide plate 22.

For ease of explanation, FIG. 4 illustrates the main body of lighting device 14 with only one unit light guide plate 23 having a parallel groove 22b. Needless to say, each unit light guide plate 23 only forms part of the whole light guide plate 22. More specifically, the main body of lighting device 14, as illustrated in FIG. 3, comprises the light guide plate 22 essentially consisting of two or more unit light guide plates 23, and the optical member unit 24 disposed on the light guide plate 22 has substantially a same size (area) as the light exit surface 22a of the light guide plate 22.

The linear light sources 12 are provided in the respective parallel grooves 22b of the light guide plate 22 and connected to the respective inverter units 18. The linear light sources 12 used in the present invention are linear, or small-diameter, rod-shaped, cold cathode tubes (cold cathode fluorescent lamp: CCFL, see FIG. 6) and are used to provide planar illumination. In the embodiment under discussion, a cold cathode tube is used as the linear light source 12 but the linear light source 12 may be of any other type, provided that it is a rod-shaped light source (linear light source). Aside from the cold cathode tube (CCFL), various other light sources can be employed, including an ordinary fluorescent tube (hot cathode tube, or cold cathode fluorescent lamp (HCFL)), an external electrode tube (external electrode fluorescent lamp: EEFL), a light emitting diode (LED), and a semiconductor laser. When using LEDs as the linear light sources 12, a transparent light guide member of either a cylindrical or a prismatic form comparable in length to the parallel grooves 22b in the light guide plate 22 may be provided with LEDs on both of its top and bottom sides to construct LED light sources such that the light from the LEDs is admitted to the light guide member through the top and bottom sides thereof and then emitted from its lateral sides.

The inverter units 18 to switch on/off the linear light sources 12 and the power supply 38 (see FIG. 6) will be described later in detail.

The light guide plate 22 comprises unit light guide plates 23 as illustrated in FIG. 5A.

Figure 5B:
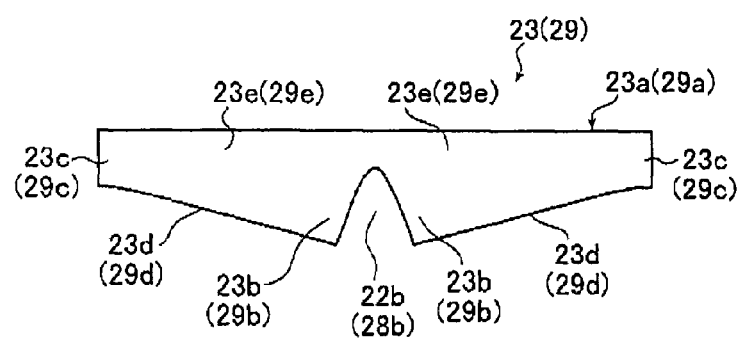
FIG. 5B is a diagram illustrating the cross-sectional shape of one unit light guide plate in the main body of lighting device illustrated in FIG. 4.

The unit light guide plate 23 is formed of a transparent resin and, as illustrated in FIG. 5B, comprises an individual rectangular light exit surface 23a, a thick portion 23b parallel to one side of the light exit surface 23a, thin end portions 23c formed at either side of the thick portion 23b and parallel to one side of the latter, inclined rear portions 23e that decrease in thickness from the thick portion 23b toward the thin end portions 23c in a direction perpendicular to the one side of the thick portion 23b to form curved inclined surfaces 23d that define the rear surface 22d of the light guide plate 22, and a parallel groove 22b that is formed in the thick portion 23b parallel to one side thereof to accommodate the light source 12. In short, the unit light guide plate 23 comprises one parallel groove 22b and the individual light exit surface 23a that extends in a direction parallel to the parallel groove 22b and which has a same length as the light exit surface 14a of the light guide plate 22. The unit light guide plate 23 is symmetrical in a plane perpendicular to the direction in which the parallel groove 22b extends with respect to a line passing through the parallel groove 22b and perpendicular to the individual light exit surface 23a.

The unit light guide plate 23 and the light guide plate 22 may be of the structures and materials, for example, as disclosed in paragraphs [0036] to [0039] in the specification of JP 2005-234397 A for which an application was filed by the assignee of the present invention.

In addition to the illustrated configuration formed by two crossing hyperbolic segments, the parallel groove 22b may have any other cross-sectional shape that is effective in increasing the uniformity in brightness, such as a triangular shape, a U shape and a parabola. For examples that may be used, see paragraphs [0040] to [0058] in the specification of JP 2005-234397 A for which an application was filed by the assignee of the present invention.

The inclined surfaces 23d may be each formed of a curved surface as illustrated or a flat surface provided at a constant angle with respect to the individual light exit surface 23a. Alternatively, the inclined surfaces 23d may be formed of flat surfaces each with an angle of inclination changing gradually from one to the next, provided that the inclined surfaces 23d, be they flat or curved, must be parallel to the parallel groove 22b.

The unit light guide plate 23 admits illuminating light emitted from the linear light source 12 accommodated in the parallel groove 22b. The admitted light on one hand travels from the thick portion 23b toward either thin end portion 23c by propagating through the inclined rear portion 23e in a direction parallel to the individual light exit surface 23a, while the admitted light is directed toward the inclined surfaces 23d forming the rear surface of the unit light guide plate 23 and reflected by the inclined surfaces 23d and the reflective member 26 provided across the inclined surfaces 23d on the other hand. Consequently, the incident light is emitted from the individual light exit surface 23a as uniform illuminating light.

Thus, uniform illuminating light is emitted from the light exit surface 22a of the light guide plate 22 made of unit light guide plates 23 connected.

As is clear from FIG. 5A, the light guide plate 22 has such a structure that adjacent unit light guide plates 23 placed side by side in a direction perpendicular to the parallel grooves 22b are joined at their thin end portions 23c, with joints between the thin end portions 23c forming the thinnest portions of the light guide plate 22. The light exit surfaces 23a of the individual unit light guide plates 23 are joined flush to each other so that the light exit surface 22a formed in the completed light guide plate 22 presents a uniform flat surface.

As illustrated in FIG. 5A, the light guide plate 22 may be a light guide plate molded into a single one-piece block of light guide plate consisting of unit light guide plates 23 connected. If desired, with a view to achieving cost reduction, higher yield and ease of manufacturing, such blocks of light guide plate, each block being formed of unit light guide plates molded into one piece, may in turn be connected to fabricate a large-sized light guide plate having a large-sized light exit surface 22a. In this alternative case, adjacent blocks of light guide plate may be connected at thin end portions 23c of unit light guide plates 23 so that they extend in a direction perpendicular to the parallel grooves 22b to increase the area of the light exit surface 22a. Alternatively, adjacent blocks of light guide plate may be connected at end portions that are perpendicular to the thin end portions 23c of unit light guide plates 23 so that they extend in a direction parallel to the parallel grooves 22b to increase the area of the light exit surface 22a. In still another possible configuration, adjacent blocks of light guide plate may be connected in two directions, one being parallel and the other perpendicular to the parallel grooves 22b, to increase the area of the light exit surface 22a. Needless to say, the uniform planar light exit surfaces 23a of the individual blocks of light guide plate are joined flush to each other so that the light exit surface 22a formed in the completed light guide plate 22 exhibits a uniform flat surface. In this case, the linear light sources 12 preferably are each equal in length to the parallel grooves 22b in the light guide plate 22 completed by connecting blocks of light guide plate and that the optical member unit 24 provided on top of the light guide plate 22 has substantially a same size (area) as the light exit surface 22a of the light guide plate 22.

The optical member unit 24 increases the uniformity of the illuminating light emitted from the light emerging face 22a of the light guide plate 22 so that illuminating light with further enhanced uniformity is emitted from the light exit surface 14a of the main body of lighting device 14. As illustrated in FIGS. 3 and 4, the optical member unit 24 comprises a prism sheet 24a, a diffusion sheet 24b, and a transmittance adjusting member 24c. The prism sheet 24a has a row of micro-prisms formed parallel to the parallel grooves 22b in the light guide plate 22 so that they compose the light exit surface 14a, and serves to provide enhanced brightness by ensuring that the illuminating light emitted from the light exit surface 22a of the light guide plate 22 condenses more efficiently. The diffusion sheet 24b diffuses the illuminating light leaving the light exit surface 22a of the light guide plate 22 to increase its uniformity. The transmittance adjusting member 24c is used to reduce the unevenness in brightness of the illuminating light leaving the light exit surface 22a of the light guide plate 22, and comprises a transparent film 25a and a number of transmittance adjusters 25b that are provided on the surface of the transparent film 25a in such a way depending upon the unevenness in brightness. The transmittance adjusters 25b are each formed of diffusing reflectors.

The transmittance adjusting member 24c is preferably provided on the side of the light guide plate 22 that is closer to the light exit surface 22a. However, the order in which the prism sheet 24a and the diffusion sheet 24b are provided and the number of the prism sheets and diffusion sheets are not limited in any particular way. In addition, the prism sheet 24a, the diffusion sheet 24b, and the transmittance adjusting member 24c used in the optical member unit 24 are by no means limited to those described above, and any kind of optical member may be employed, provided that it increases the uniformity of the illuminating light emitted from the light exit surface 22a of the light guide plate 22. Note also that the prism sheet 24a may be provided on the rear surface 22d of the light guide plate 22 between the light guide plate 22 and the reflective member 26. Alternatively, a row of prisms may be directly formed on the rear surface 22d of the light guide plate 22.

As for optical members that may be used in the optical member unit 24 comprising the prism sheet 24a, the diffusion sheet 24b, and the transmittance adjusting member 24c, reference may be had to the paragraphs [0028] to [0033] in the specification of JP 2005-234397 A for which an application was filed by the assignee of the present invention.

The reflective member 26 used in the main body of lighting device 14 is provided across the rear surface 22d of the light guide plate 22, and serves to improve the use efficiency of the illuminating light emitted from the linear light sources 12. The reflective member 26 comprises reflective sheets 26a and reflectors 26b. The reflective sheets 26a are provided on the side of the light guide plate 22 on which the parallel grooves 22b are formed, and covers the whole rear surface 22d of the light guide plate 22 except where the parallel grooves 22b are formed, to reflect the light leaking from the backside of the light guide plate 22 and admit the light back to the light guide plate 22. The reflectors 26b are provided between adjacent reflective sheets 26a beneath the linear light sources 12 in such a way as to close the individual parallel grooves 22b in the light guide plate 22. Thus, the reflectors 26b reflect light from beneath the linear light sources 12 so that the reflected light is admitted through the lateral wall surfaces of the parallel grooves 22b in the light guide plate 22.

The reflective sheets 26a and the reflectors 26b are provided in a form of a single sheet member in this embodiment, but may be provided as separate members from each other.

The support member 28 is provided on the side of the reflective member 26 opposite from the light guide plate 22 and has a configuration formed by continuously alternating concave and convex portions 29. The support member 28 has substantially the same configuration as the light guide plate 22. Each concave and convex portion 29 has substantially a same configuration as the unit light guide plate 23 of the light guide plate 22 and is formed of an identical material as the unit light guide plate 23. Specifically, the concave and convex portion 29, as illustrated in FIG. 5B, comprises a rectangular individual flat surface 29a, thick portions 29b (convex portion) parallel to one side of the individual flat surface 29a, thin end portions 29c (concave portion) formed on either side of the thick portion 29b and parallel to one side of the thick end portions 29b, inclined rear portions 29e that decrease in thickness from the thick portions 29b toward either of the thin end portions 29c in a direction perpendicular to one side of the thick portion 29b to form curved inclined surfaces 29d that in turn define the rear surface 28d of the support member 28, and parallel grooves 28b formed parallel to the one side of the thick portion 29b. In short, each concave and convex portion 29 comprises one parallel groove 28b and the individual flat surface 29a that extends in a direction parallel to the parallel groove 28b and which has a same length as the flat surface 28a of the support member 28.

Thus, the rear surface 28d of the support member 28 has a profile that is a reverse of that of the rear surface 22d of the light guide plate 22.

The support member 28 is provided such that the rear surface 28d, which is the side of the support member 28 opposite from the flat surface 28a, faces the rear surface 22d of the light guide plate 22. The thin end portions 29c of the concave and convex portions 29 of the support member 28 are each so disposed to face the parallel grooves 22b of the unit light guide plates 23 forming the light guide plate 22. In other words, the parallel grooves 28b in the concave and convex portions 29 of the support member 28 are each so disposed to face the thin end portions 23c of the unit light guide plates 23 forming the light guide plate 22.

Thus, the light guide plate 22 can be supported from under its rear surface 22d by the support member 28 provided thereunder that has the same configuration as the light guide plate 22 such that the light guide plate 22 can be placed in close contact with the reflective member 26. Thus, the light emitted by the linear light sources 12 and admitted through the parallel grooves 22b can be reflected by the reflective member 26 disposed in close contact with the inclined surfaces 29d without allowing the light to exit from the inclined surfaces 29d.

Another benefit obtained from the structure described above is that breaks or damage that might otherwise be caused to the light guide plate 22 as it touches some other member can be prevented. If, for example, the planar lighting device is shaken when it is moved or transported, the structure having the light guide plate 22 disposed on the support member 29 in intimate contact prevents an edge formed between any of the inclined surfaces 23d and an adjacent parallel groove 22b from being broken or damaged as the edge touches some other member.

Thus, unevenness in brightness resulting from breaks or damage caused to the light guide plate can be prevented, and emission of uniform light is ensured.

Providing the support member consisting of a plurality of concave and convex portions molded into a one-piece composition eliminates the need to provide a separate individual support member against each concave portion formed by the inclined surfaces 23d of adjacent unit light guide plates 23, which makes it easy to position the support member with respect to the light guide plate. This in turn reduces the number of component parts required and hence makes the assembly thereof easier.

Further, using the support member 28 that is a reverse in profile of the light guide plate manufactured, i.e., using component members having an identical configuration to provide the support member 28 and the light guide plate 22 eliminates the need to manufacture the support member as a different member, and hence reduces manufacturing costs.

Furthermore, a product manufactured as the light guide plate but cannot be used as such because of damage or other defects on its surface, for example, may be used as the support member. This allows an efficient use of manufactured parts, increases the yield, and reduces the manufacturing costs.

It is preferable to use a light guide plate as support member that is manufactured at close proximity to or near the light guide plate. In other words, it is preferable to use a support member manufactured under same manufacturing conditions as the light guide plate used therewith.

Using component members manufactured as the light guide plate and the support member in close proximity to or near each other permits using the light guide plate and the support member manufactured under same manufacturing conditions, including manufacturing environments such as temperature and humidity, and materials, and, in cases where the manufacturing process comprises extrusion, extrusion speed and pressure. Thus, by manufacturing the light guide plate and the support member under the same manufacturing conditions, possible pitch errors that may occur at the time of manufacture can be canceled out, yielding the light guide plate and the support member with substantially a same configuration, i.e., a configuration substantially free from shape errors. Hence, the light guide plate and the support member can be disposed on each other without misalignment, which in turn enables prevention of breakage of the light guide plate with increased reliability. In addition, displacement of the reflective member can be also prevented.

As with the light guide plate 22, the support member 28 may also be a block of concave and convex portions 29 molded in one piece, and, as preferred, consist of connected one-piece blocks of concave and convex portions.

While the support member preferably has a same configuration as the unit light guide plate to reduce the manufacturing costs, the support member may alternatively have a different configuration than the light guide plate, provided that the surface of the support member facing the rear surface of the light guide plate has a configuration that is a reverse of the rear surface of the light guide plate. The support member may therefore have a different thickness than the light guide plate.

Further, the support member need only have a same configuration as the concave portions formed by the inclined surfaces of adjacent light guide plates and thus may or may not have portions corresponding to the parallel grooves formed in the unit light guide plates. With the support member without the parallel grooves formed therein, the rear surface of the support member can be disposed over the whole surface formed by the inclined surfaces of the unit light guide plates.

The main body of lighting device 14 essentially has a following composition.

As illustrated in FIG. 3, the housing 16 holds therein the main body of lighting device 14 such that the housing 16 secures the main body of lighting device 14 by holding it on two sides, one facing the light exit surface 14a and the other facing the reflective member 26. The housing 16 comprises a lower housing 30, an upper housing 32, and a turnup member 34. The lower housing 30 is open at the top so that the main body of lighting device 14 is fitted therein from above, covering the four lateral sides of the main body of lighting device 14. The upper housing 32 has on its top a rectangular opening 16a smaller than the rectangular light exit surface 14a of the main body of lighting device 14, is open on the bottom, and is placed from above over the main body of lighting device 14 that is accommodated in the lower housing 30 so that the upper housing 32 covers the four lateral sides of the lower housing 30. The turnup member 34 has an inverted U shape and is inserted between a sidewall of the lower housing 30 and a sidewall of the upper housing 32. Although not shown in FIG. 3, an inverter casing 20 (see FIG. 2) that accommodates inverter units 18 is provided on the rear side of the lower housing 30.

In order to join the lower housing 30 to the turnup member 34, and the turnup member 34 to the upper housing 32, various known methods can be employed, such as the combination of bolts and nuts, and the use of an adhesive.

The upper housing 32 must be larger than the lower housing 30 so that the turnup member 34 can at least be provided in a gap between the outer surface of each of the two lateral sides of the lower housing 30 that are parallel to the parallel grooves 22b in the light guide plate 22 in the main body of lighting device 14 or to the linear light sources 12 accommodated in the parallel grooves 22b on one hand and the inner surface of each of the two corresponding lateral sides of the upper housing 32 on the other. If desired, the turnup member 34 may be provided on the four sides of the housing 16 between the sidewalls of the lower housing 30 and those of the upper housing 32. It is preferable to provide a reinforcement member that reinforces the recess in the U-shaped turnup member 34.

Thus, the provision of the turnup member 34 increases the rigidity of the housing 16 and permits uniform emission of light with enhanced efficiency. Further, the turnup member 34 ensures correction or prevention, with increased certainty, of warpage that may occur in the light guide plate 22 that has the parallel grooves and, hence, may be liable to warp. Consequently, unevenness in brightness can be inhibited and good optical characteristics can be obtained. Further, the reinforcement member to fortify the recess of the turnup member 34 increases the rigidity of the housing 16 and hence better prevents warpage in the light guide plate 22, thereby obtaining good optical characteristics.

Note that the housing 16 may be provided with fastening members such as L-shaped fasteners for joining its four corners, an elastic member formed of an elastic material such as rubber and fitted between the prism sheet 24a in the main body of lighting device 14 and the periphery of the opening 16a in the upper housing 32, and a protective member that protects the whole top surface of the prism sheet 24a in the main body of lighting device 14.

This is the basic composition of the housing 16.

Description will now be made of the drive unit for driving linear light sources 12 accommodated inside the parallel grooves 22b in the light guide plate 22 in the main body of lighting device 14.

Figure 6A:
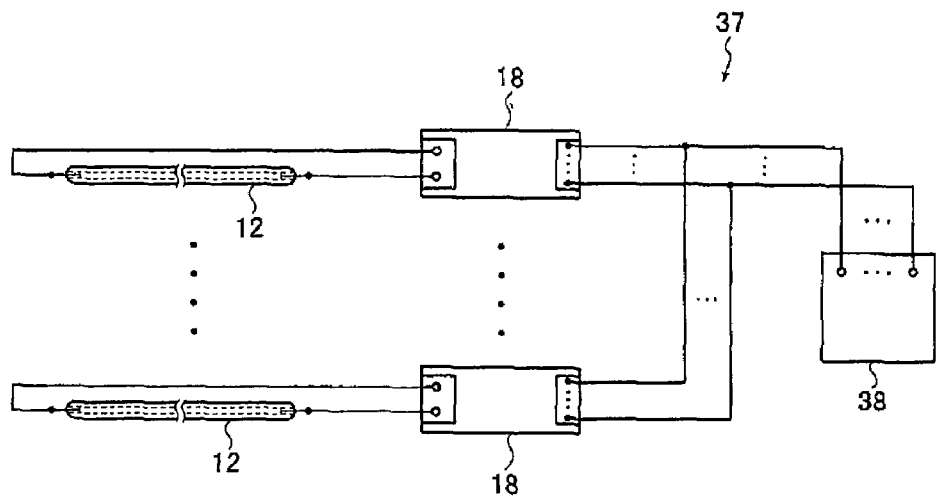
FIG. 6A is a wiring diagram for an embodiment of a drive unit for linear light sources used in the planar lighting device illustrated in FIG. 2.
Figure 6B:
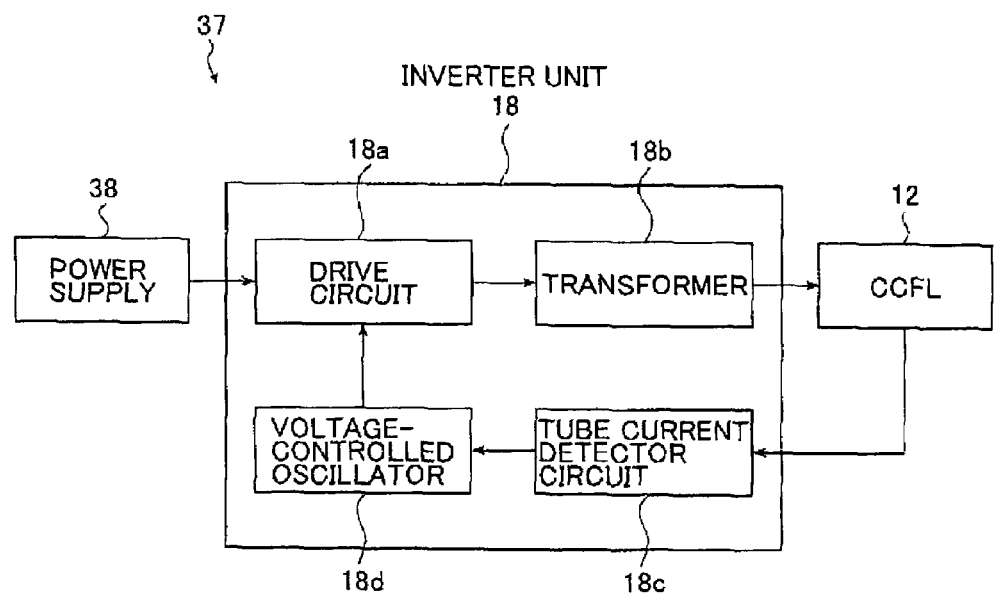
FIG. 6B is a block diagram for the drive unit for one linear light source illustrated in FIG. 6A.

The drive unit generally indicated by 37 in FIGS. 6A and 6B drives, namely, turns on and off, the linear light sources 12 such as CCFLs to perform the illuminating action of the planar lighting device 10. Having this function, the drive unit 37 comprises inverter units 18 connected to the respective linear light sources 12 such as CCFLs and a power supply connected to the inverter units 18. FIG. 6B is a block diagram of the drive unit 37 for turning on one linear light source 12 such as a CCFL to illustrate details of the composition of the inverter unit 18.

The power supply 38 is a DC power supply for outputting a DC voltage, say, at 24 volts. The DC voltage is supplied to each of the inverter units 18 connected to the power supply 38.

Each inverter unit 18 comprises a drive circuit 18a, a transformer 18b, a tube current detector circuit 18c, and a voltage-controlled oscillator 18d. The drive circuit 18a receives the OC voltage from the power supply 38 and generates a primary AC signal of a predetermined frequency at a predetermined voltage (say, 650 Vp-p). The transformer 18b is connected to the linear light source 12 and boosts the primary AC signal generated in the drive circuit 18a to a secondary AC signal having a sufficiently high voltage (say, 6500 V p-p and 1000 to 2400 Vrms) to turn on the linear light source 12 such as a CCFL. The tube current detector circuit 18c is also connected to the linear light source 12 such as a CCFL and detects a tube current flowing through it. The voltage-controlled oscillator 18d receives a feedback of the tube current delivered from the tube current detector circuit 18c, and in accordance with the tube current thus fed back, oscillates a clock (fundamental wave) of a predetermined frequency for generating the primary AC signal in the drive circuit 18a.

With the drive unit 37 for the linear light sources 12 constructed as described above, the light sources 12 can be lit up simultaneously and uniformly with high efficiency in a consistent and safe manner, thereby permitting light emission with uniform brightness.

While the linear light sources 12 are turned on simultaneously in the foregoing description, the inverter units 18, alternatively, may be adapted to selectively turn on a limited number of linear light sources. Alternatively, the linear light sources 12 may be turned on either simultaneously or selectively, by switching between such lighting modes.

Described above are the basic compositions of the drive unit for the linear light sources, as well as the planar lighting device.

Figure 7:
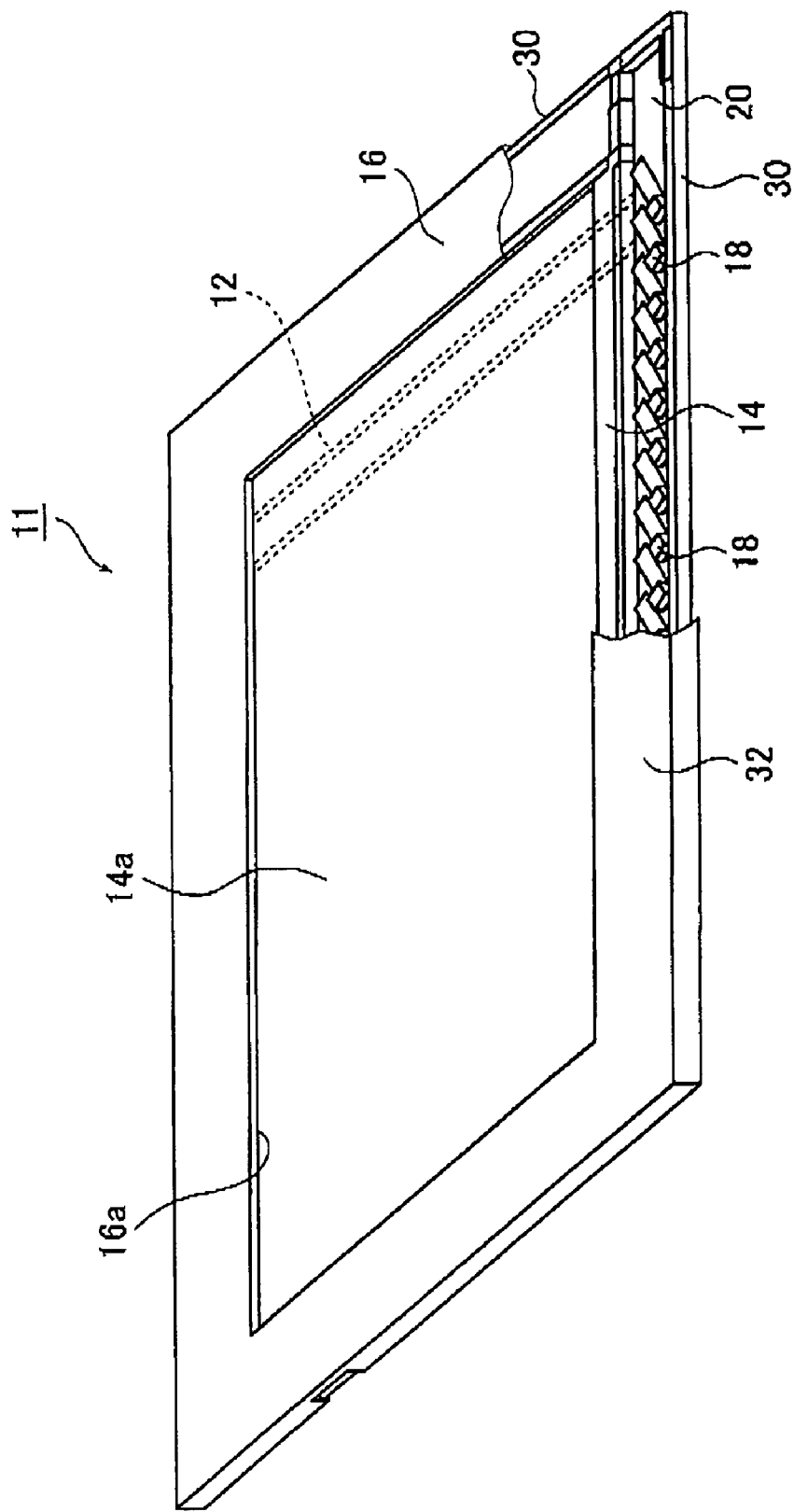
FIG. 7 is a schematic view illustrating the composition of still another embodiment of the planar lighting device of the present invention.

In the foregoing embodiment of the planar lighting device 10, the inverter casing 20 is provided on the rear side of the housing 16 to accommodate inverter units 18. However, the planar lighting device according to the present invention may alternatively be modified as generally indicated by 11 in FIG. 7, where a space is provided between the lower housing 30 and the upper housing 32 in an area adjacent a side of the opening 16a in the housing 16 that is perpendicular to the linear light sources 12 so as to provide the inverter casing 20 in which inverter units 18 are accommodated. In this way, the rear surface of the planar lighting device 11 and, hence, the rear surface of the housing 16 are made sufficiently flat that the planar lighting device 11 can be easily installed on ceilings or walls.

While, in the above embodiment, the reflective member is provided between the light guide plate and the support member, the surface of the support member facing the light guide plate may, alternatively, be coated with a sprayed reflective material instead of providing the reflective member.

In cases where the surface of the support member is directly sprayed with a reflective material, the support member can be provided with a function of the reflective member so that the light emitted from the rear surface of the light guide plate can be reflected and admitted back to the light guide plate without the need to provide the reflective member between the light guide plate and the support member. Thus, the use efficiency of the illuminating light can be increased while the structure of the device can be simplified.

The reflective material may be selected from various materials that can be used for the reflective member. The method whereby a film of the reflective material is formed on the surface of the support member is not limited to spraying and may be vapor deposition, adhesion, or any other appropriate method to form a reflective film on the surface of the support member.

Figure 8:
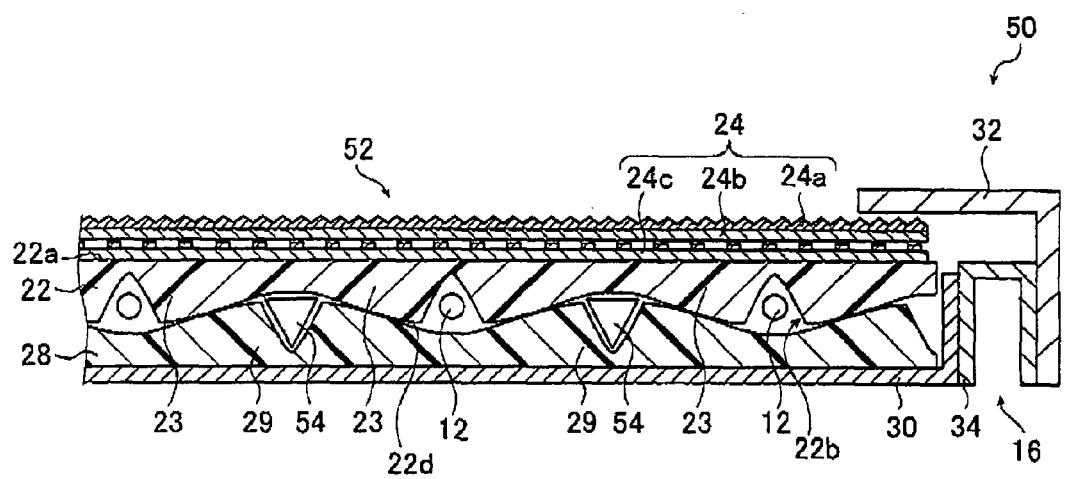
FIG. 8 is a partial cross-section of another embodiment of the planar lighting device of the present invention.

FIG. 8 is a partial cross-section illustrating another embodiment of the planar lighting device according to the invention.

The planar lighting device 50 illustrated in FIG. 8 is identical to the planar lighting device illustrated in FIG. 3 except that the former does not have the reflective member but has reflectors 54 provided in the parallel grooves formed in the support member 28. In the description to follow, therefore, the same components shared by both embodiments are indicated by the same reference numerals, of which detailed description will be spared, and the features unique to the planar lighting device 50 will be described in detail.

The support member 28 is provided on the side of the light guide plate 22 closer to the rear surface 22d such that the rear surface 28d of the support member 28 is in contact with the rear surface 22d of the light guide plate 22. The support member 28 has the reflective film formed on the surface thereof facing the light guide plate 22, i.e., the rear surface 28d. The reflective film reflects the light leaking from the light guide plate 22 to admit the light back to the light guide plate.

The reflectors 54 are embedded in the parallel grooves formed in the concave and convex portions 29 of the support member 28. The surface of each reflector 54 is formed with a material having a reflectivity. The reflectors 54 reflect the light leaking from the light guide plate 22 and direct it back to the light guide plate 22.

With the reflectors 54 provided in the parallel grooves 29b of the support member 28, the reflective member can be provided across the light guide plate including places that face the thin end portions 23c of the light guide plate 22 in a closely matching profile. Thus, the light emitted from the inclined surface of the light guide plate 22 is reflected diffusely by the parallel grooves 29b of the support member 28, and unevenness in brightness of the light leaving the light exit surface can be inhibited. Thus, the structure with the reflectors 54 so provided permits emitting light from the light exit surface with unevenness in brightness further reduced.

Preferably, the surfaces of the reflectors 54 facing the light guide plate each have a configuration closely profiling that of the rear surface of the light guide plate 22. Since the surfaces of the reflectors 54 facing the light guide plate is given a configuration that closely profiles the configuration of the rear surface of the light guide plate 22, the reflectors can be disposed on the rear surface of the light guide plate in intimate contact such that the diffuse reflection of light can be prevented and, consequently, the light can be reflected with a minimum loss.

The inclined surfaces 23d of each unit light guide plate 23 of the light guide plate 22 and the inclined surfaces 29d of each concave and convex portion 29 of the support member 28 are preferably symmetrical with respect to the midpoint between the center of each unit light guide plate 23 or each concave and convex portion 29 on one hand and either of the thin end portions on the other in a plane perpendicular to the direction in which each parallel groove 22b extends.

Figure 9A:
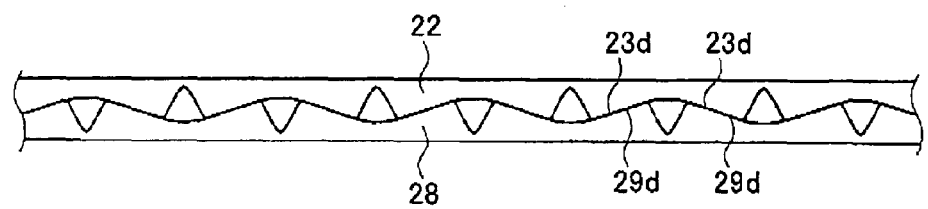
FIGS. 9A and 9B are schematic side views each illustrating another embodiment of the light guide plate and the support member of the main body of lighting device according to the present invention.
Figure 9B:
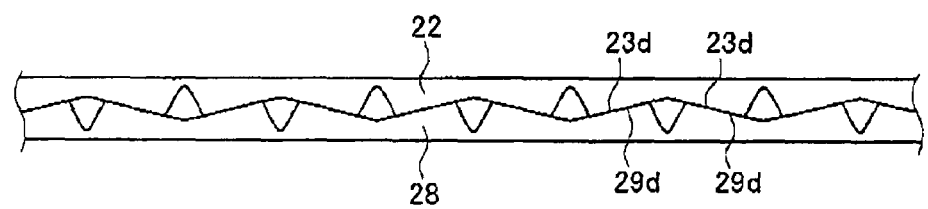

FIGS. 9A and 9B are schematic side views each illustrating the light guide plate and the support member of the main body of lighting device according to the present invention.

The inclined surfaces 23d of each unit light guide plate 23 of the light guide plate 22 illustrated in FIG. 9A are formed of curved surfaces that are symmetrical with respect to the midpoint between the center of each unit light guide plate 23 and either of the end portions thereof (the ends of the thin end portions 23c) in a plane perpendicular to the direction in which each parallel groove 22b extends. Each concave and convex portion 29 of the support member 28 has a same configuration as the unit light guide plate 23.

With the inclined surfaces formed point-symmetric, the rear surface of the light guide plate 22 and that of the support member 28 have the same configuration in profile where they mate as they are disposed on each other. In other words, the light guide plate 22 and the support member 28 can be disposed on each other allowing no space between them.

The inclined surfaces 23d of the light guide plate 22 and the inclined surfaces 29d of the support member 28 need not necessarily be curved surfaces and may be flat surfaces as illustrated in FIG. 9B.

Since the unit light guide plate 23 and each concave and convex portion 29 are symmetric with respect to the line passing through the center of the parallel groove and perpendicular to the light exit surface or the flat surface in a plane perpendicular to the direction in which each parallel groove 22b extends, the inclined surfaces 23d of the light guide plate 22 and the inclined surfaces 29d of the support member 28 are tilted at a same angle so that the inclined surfaces 23d and the inclined surfaces 29d can be disposed on each other allowing no space between them.

With the light guide plate and the support member disposed on each other without space between them, the light guide plate 22 and the support member 28 can be disposed intimately on each other. Thus, the light guide plate can be supported with increased firmness.

Further, in an embodiment having the reflective member between the light guide plate and the support member, the reflective member can be firmly fixed by the whole inclined surface of the support member 28 to bring the reflective member into intimate contact with the light guide plate so that the light leaking from the light guide can be reflected with enhanced efficiency.

Also in an embodiment where the reflective film is provided on the surface of the support member instead of the reflective member, the whole inclined surface of the support member can be disposed on the inclined surface of the light guide plate in intimate contact so that the light leaking from the light guide plate can be reflected efficiently while the structure of the device can be simplified at the same time.

The light guide plate and the support member of the planar lighting device according to the present invention are preferably secured to each other with a fixing means.

As described above, since the light guide plate and the support member are formed of an identical material and that the light guide plate and the support member are so disposed that their rear surfaces face each other, the light guide plate and the support member would warp in like manner and in the opposite direction. Therefore, warpage that may occur in the light guide plate and the support member can be inhibited by fastening the light guide plate and the support member to each other, i.e., by bonding them so that forces are created in such directions that the light guide plate and the support member are inhibited from warping.

To fasten the light guide plate and the support member to each other with a fixing means, the light guide plate and the support member preferably have a same length in a direction perpendicular to the parallel grooves. When the light guide plate and the support member have a same length, the warpage of the light guide plate can be better inhibited.

To secure the light guide plate to the support member, a mechanical fastening method may be used whereby a fixing means such as screws and rivets is driven into the light guide plate and the support member, i.e., fixing members are fitted into the light guide plate and the support member. Alternatively, an adhesive may be used to bond them to each other.

The mechanical fixing method is preferred because the light guide plate can then be inhibited from warping with increased reliability and the intimacy with which the reflective film is disposed on the light guide plate is further enhanced.

Fixing members preferably have a surface with a color having a small light absorption factor such as white and more preferably are made of a transparent material such as a transparent resin. The fixing members having a surface with a color of a small light absorption factor permits efficient reflection of light. The fixing members made of a transparent material transmit light, permit efficient use of light, and prevent the occurrence of unevenness in brightness that might be caused should light be reflected by the fixing members, thereby enabling emission of uniform light from the light exit surface.

When the fixing members are fitted from the support member to the light guide plate to fasten them, fixing members each having a surface with a color of a small light absorption factor such as white or fixing members made of a transparent material can be favorably used. When the fixing members are fitted from the light guide plate to the support member to fasten them, part of each fixing member is exposed on the light exit surface. It is therefore preferable in this case to use fixing members formed of a transparent material such as a transparent resin.

The fixing members preferably have a refractive index of 90% inclusive to 110% inclusive, and more preferably from 95% inclusive to 110% inclusive, of the refractive index of the light guide plate. In particular, screws or rivets, when used as the fixing members, are preferably made of a material that has substantially a same refractive index as the light guide plate.

When screws or rivets made of a material having a refractive index designated above are used, unevenness in brightness that might otherwise occur in places where the screws or rivets are fitted can be prevented to allow emission of uniform light from the light exit surface.

There is no restriction to the positions at which the fixing members such as screws and rivets are used to secure the light guide plate. For example, the fixing members may be provided at regular intervals to fasten the light guide plate and the support member or may be provided to fasten the light guide plate and the support member only at particular positions effective to prevent warping.

Figure 10A:
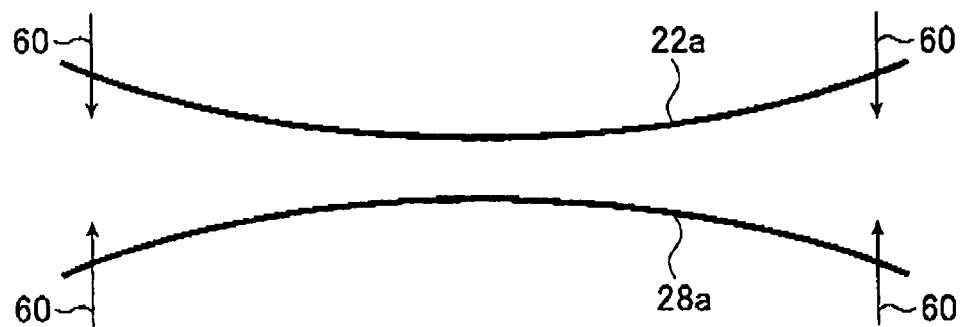
FIGS. 10A and 10B are schematic views each illustrating examples of warps of the light guide plate and the support member of the main body of lighting device according to the present invention.
Figure 10B:
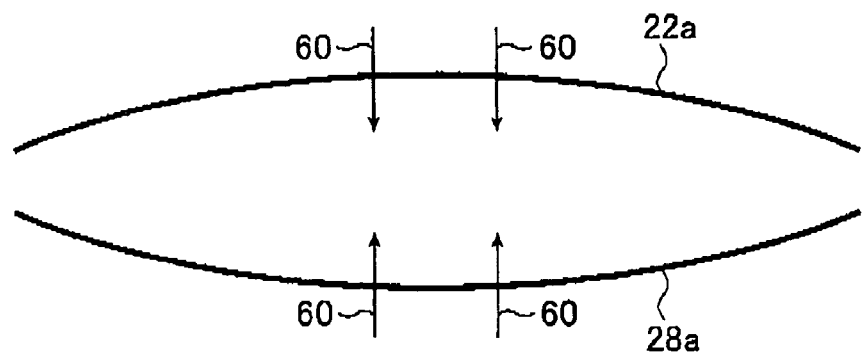

FIGS. 10A and 10B are schematic views each illustrating the relation between the warps of the light guide plate and the support member. For the sake of clarity, FIGS. 10A and 10B only show the light exit surface 22a for the light guide plate 22 and the flat surface 28a for the support member 28. The fixing members 60 are each indicated by an arrow.

In cases where, as illustrated in FIG. 10A, the light guide plate 22 (its light exit surface 22a) and the support member 28 (its flat surface 28a) may warp inwardly toward the center, the warping of the light guide plate can be effectively inhibited by fastening the light guide plate 22 and the support member 28 with the fixing members 60 at their peripheries.

In cases where, as illustrated in FIG. 10B, the light guide plate 22 (its light exit surface 22a) and the support member 28 (its flat surface 28a) may warp outwardly at the center, the warpage of the light guide plate can be effectively inhibited by fastening the light guide plate 22 and the support member 28 with the fixing members 60 near their centers.

FIGS. 11A through 11D are schematic cross-sections illustrating examples of fixing members that may be used in the planar lighting device according to the present invention. In FIGS. 11A through 11D, only one fixing member is shown for easy reference.

Figure 11A:
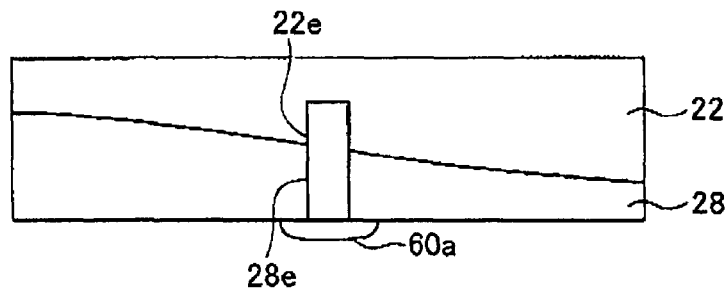
FIGS. 11A to 11D are schematic cross-sections each illustrating examples of fixing members for the planar lighting device according to the present invention.

As illustrated in FIG. 11A, a screw hole 22e may be formed in the light guide plate 22 and a hole 28e in the support member. Then a screw 60a is threaded from the support member 28 into the screw hole 22e of the light guide plate 22 to fasten the support member and the light guide plate.

Figure 11B:
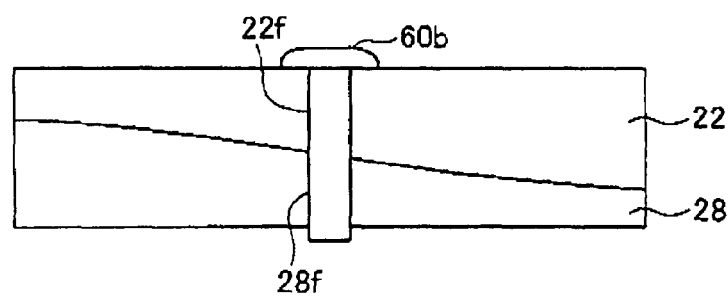

In the example illustrated in FIG. 11B, a hole 22f is formed in the light guide plate 22 and a screw hole 28f in the support member 28. The screw 60b is threaded from the light guide plate 22 into the screw hole 28f of the support member 22 to fasten the light guide plate and the support member.

Thus, the screw may be threaded from the light guide plate toward the support member or vice versa. The screw holes may be through-holes or may stop halfway through the light guide plate or the support member. The holes formed in the light guide plate and the support member may be both threaded holes.

Figure 11C:
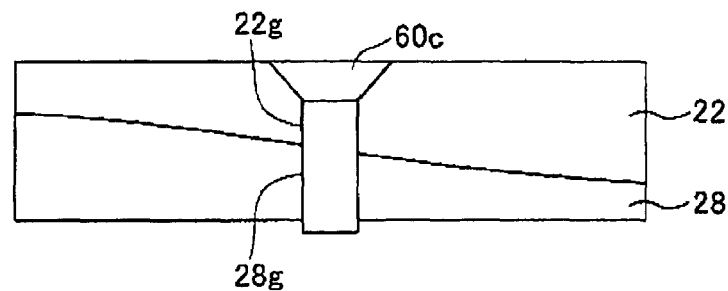

As illustrated in FIG. 11C, the light guide plate 22 may be formed with a hole 22g having a shape that allows the head of a flat head screw (small) 60c to snugly fit therein while the support member 28 may be formed with a screw hole 28g so that the flat head screw 60c is threaded into the screw hole 28g of the support member 28 from the light guide plate 22 to fasten the light guide plate 22 to the support member 28. With the hole 22g in the light guide plate 22 so formed to snugly receive the head of the screw 60c, the flat head screw 60c can be embedded in the light guide plate 22 such that the whole light exit surface remains flat after the screws are fitted.

Figure 11D:
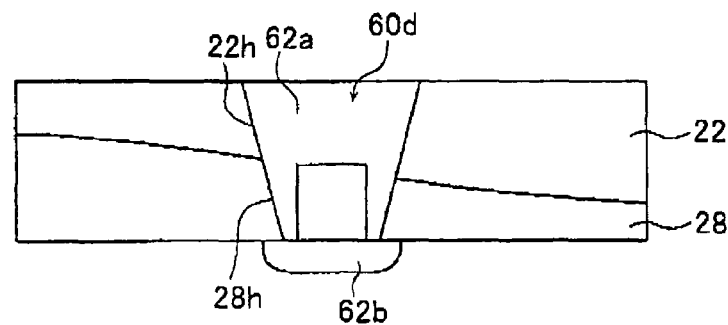

While every example illustrated in FIGS. 11A through 11C uses screws to fasten the light guide plate and the support member, the present invention is not limited thereto. As illustrated in FIG. 11D for example, tapered holes 22h and 28h may be formed in the light guide plate 22 and the support member 28, respectively, such that their diameters decrease from the light exit surface of the light guide plate toward the flat surface of the support member 28. A fixing means 60d illustrated comprises a tapered pin 62a with a screw hole formed therein and a screw 62b. The tapered pin 62a is fitted from the light guide plate 22 while the screw 62b is threaded from the support member 28 into the threaded hole of the tapered pin 62a to fasten the light guide plate and the support member 28.

Needless to say, the head of the screw 62b has a greater diameter than a minimum diameter of the tapered pin 62a. As with the screws, the tapered pin 62a preferably is made of a material having a refractive index of 90% inclusive to 110% inclusive of the refractive index of the light guide plate, and more preferably 95% inclusive to 110% inclusive of the refractive index of the light guide plate, and still more preferably, a same refractive index as the light guide plate.

While screws are used as the fixing members in the examples illustrated in FIGS. 11A through 11D, rivets may instead be used similarly in various manners to fasten the light guide plate and the support member.

With the light guide plate and the support member fastened to each other by means of fixing members, the warpage of the light guide plate can be inhibited without depending on the housing to correct the warp of the light guide plate, which helps simplify the structure of the housing.

Figure 12A:
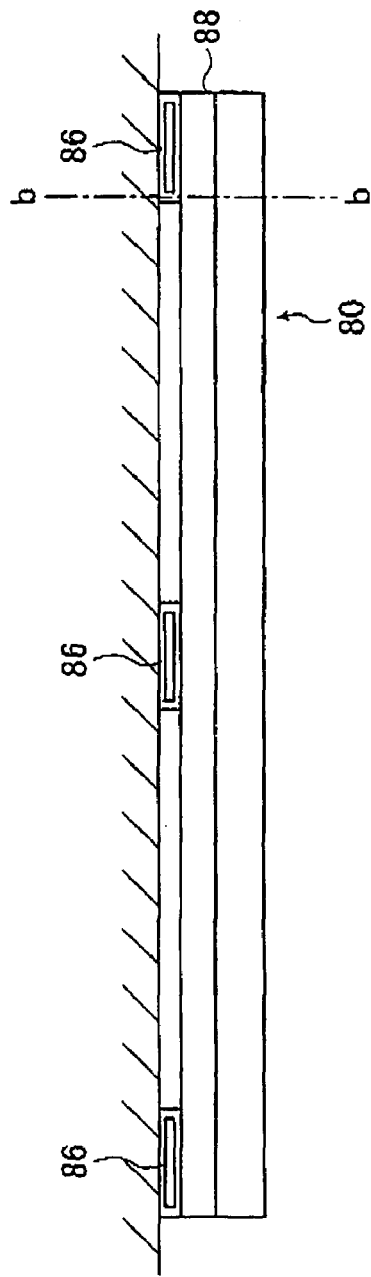
FIG. 12A is a schematic side view of yet another embodiment of the planar lighting device of the present invention.
Figure 12B:
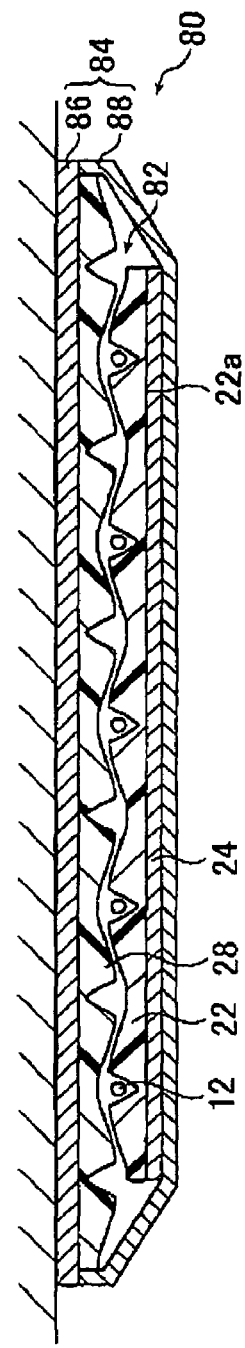
FIG. 12B is a cross-section taken along a line b-b.

FIG. 12A is a schematic side view to illustrate another embodiment of the planar lighting device of the present invention. FIG. 12B is a cross-section taken along a line b-b in FIG. 12A.

A planar lighting device 80 comprises a main body of lighting device 82, a housing 84, inverter units, and a power supply. The inverter units and the power supply are the same as those of the planar lighting device 10 described above and therefore not shown in the drawing, nor is detailed description thereof given.

The main body of lighting device 82 comprises the light sources 12, the light guide plate 22, the optical member unit 24, and the support member 28.

In the embodiment under discussion, the inclined surfaces of the light guide plate 22 and those of the support member 28 are disposed in contact with each other, and the light guide plate 22 and the support member 28 are fastened to each other with a fixing means not shown.

The surface of the support member 28 facing the light guide plate 22, i.e., the rear surface 28d of the support member 28 has a sprayed coating of a reflective material (reflective paint material) that forms a reflective film thereon. Thus, the support member 28 also has a function of the reflective member.

The light sources 12 are provided in the parallel grooves 22b of the light guide plate 22. The optical member unit 24 is provided on the side of the light guide plate closer to the light exit surface 22a of the light guide plate 22.

The housing 84 comprises stays 86 and a cosmetic diffusion plate 88.

The stays 86 are rod-shaped members extending in a direction perpendicular to the parallel grooves of the light guide plate 22 and are provided at given intervals on the flat surface of the support member of the main body of lighting device 82.

The cosmetic diffusion plate 88 is shaped like a box with an opening on one side and covers the lateral surfaces and the light exit surface of the main body of lighting device 82 from the side of the main body of lighting device 82 closer to the light exit surface thereof. The surface with the opening of the cosmetic diffusion plate 88 is fastened to the stays 86. The stays 86 and the cosmetic diffusion plate 88 support and secure the main body of lighting device 82.

The cosmetic diffusion plate 88 has the same function as the diffusion sheet described above, i.e., the function of diffusing the illuminating light as it leaves the main body of lighting device 82 to permit uniform emission of the illuminating light.

Thus, with the planar lighting device 80, the light leaving the main body of lighting device 82 is transmitted through the cosmetic diffusion plate 88 to exit.

The provision of the stays 86 on the flat surface of the support member 28 such that they extend in a direction perpendicular to the parallel grooves increases the rigidity of the main body of lighting device 82 and, hence, makes the light guide plate 22 less liable to warp.

Further, since the light guide plate 22 and the support member 28 are fastened with a fixing means, thus inhibiting the light guide plate 22 from warping, the housing 84 to support and secure the main body of lighting device 82 can be reduced to only the stays 86 that support the main body of lighting device 82 from the side of the support member 28 closer to its flat surface. Thus, the planar lighting device with a simplified structure is made possible by fastening the light guide plate 22 and the support member 28 with a fixing means.

While the stays are used as holding members (supporting means) to support the main body of lighting device in the embodiment under discussion, the present invention is not limited thereto and other rod-shaped members such as those of a tubular shape may also be used. Alternatively, sheet members such as sheet metal may be used to secure the main body of lighting device from the side thereof closer to the support member to enhance the rigidity of the main body of lighting device.

Figure 13:
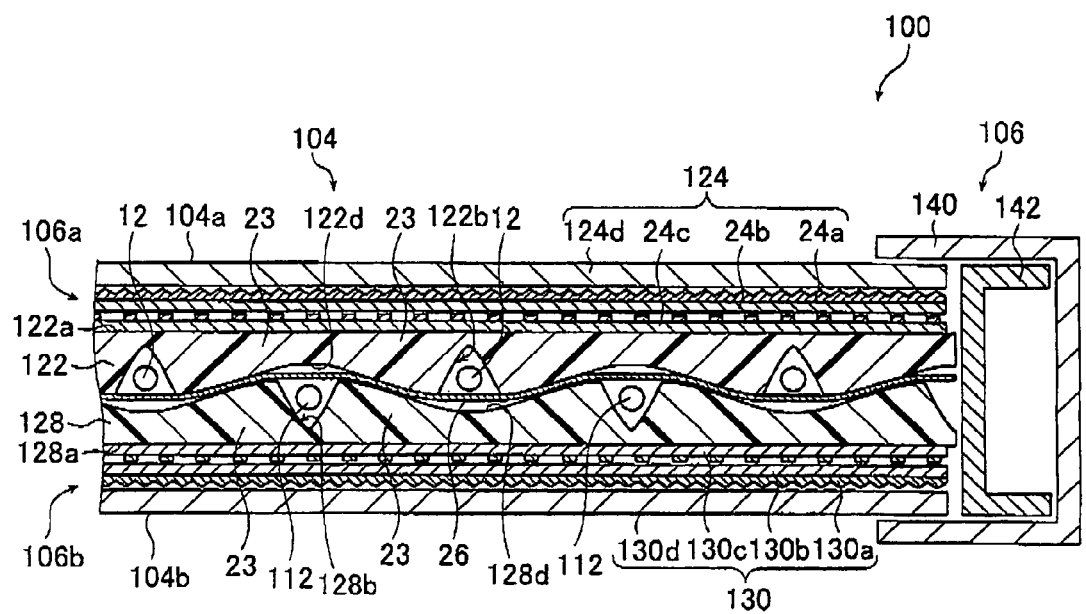
FIG. 13 is a partial cross-section of still another embodiment of the planar lighting device of the present invention.

FIG. 13 is a partial cross-section illustrating still another embodiment of the planar lighting device according to the present invention.

A planar lighting device 100 illustrated in FIG. 13 comprises linear light sources, a main body of lighting device 104 for emitting uniform light from light exit surfaces 104a and 104b, and a housing 106. The housing 106 accommodates a main body of lighting device 104 and comprises rectangular openings 106a and 106b formed for the light exit surfaces 104a and 104b, respectively.

As with the planar lighting device 10, the planar lighting device 100 comprises, though not shown, inverter units used to turn on respective linear light sources, an inverter casing for accommodating the inverter units, and a power supply connected to the inverter units accommodated in the inverter casing to turn on the individual light sources 12.

The main body of lighting device 104 essentially comprises linear light sources 12 and 112, a first light guide plate 122, an optical member unit 124, a reflective member 126, a second light guide plate 128, and an optical member unit 130. The first light guide plate 122 comprises a rectangular light exit surface 122a formed on a side closer to the light exit surface 104a and parallel grooves 122b formed on the reverse side to accommodate the respective linear light sources 12. The first light guide plate 122 also comprises thinnest portions 122c formed between adjacent parallel grooves 122b, where the distance between the light exit surface 122a and the reverse side is smallest. The optical member unit 124 is provided on a side of the first light guide plate 122 closer to the light exit surface 122a and has a rectangular plane that forms the rectangular light exit surface 104a. The reflective member 126 is so provided to intimately profile a rear surface 122d of the light guide plate 122. The second light guide plate 128 is provided on the side of the reflective member 126 opposite from the light guide plate 122 and has a rectangular light exit surface 128a on the side closer to the light exit surface 104b. The second light guide plate 128 also has parallel grooves 128b formed on its rear surface opposite from the light exit surface 128a to accommodate linear light sources 112 therein. The second light guide plate 128 is further provided with thinnest portions 128c between any adjacent parallel grooves 128b, where the distance between the light exit surface 128a and the reverse side is smallest. The optical member unit 130 is provided on the side of the second light guide plate 128 facing the light exit surface 128a and has a rectangular flat plane that forms a rectangular light exit surface 104b.

The light sources 12 and 112, the first light guide plate 122, the second light guide plate 128, and the reflective member 126 have the same shapes and functions as the light sources 12, the light guide plate 22, and the reflective member 26, respectively, of the main body of lighting device 14 described above, and are therefore not described in detail.

Similarly to the light guide plate 22 and the support member 26 of the main body of lighting device 14 described above, the first light guide plate 122 and the second light guide plate 128 are so disposed that their rear surfaces face each other and that the parallel grooves of the first light guide plate 122 oppose the thinnest portions of the second light guide plate 128.

The optical member unit 124 is provided to further enhance the uniformity of the illuminating light emitted from the light exit surface 122a of the first light guide plate 122 and emit the illuminating light with thus further enhanced uniformity from the light exit surface 104a of the main body of lighting device 104. The optical member unit 124 comprises the prism sheet 24a, the diffusion sheet 24b, the transmittance adjusting member 24c, and a cover glass 124d. Since the prism sheet 24a, the diffusion sheet 24b, and the transmittance adjusting member 24c are the same as those described above, detailed descriptions thereof are not given.

The cover glass 124d is so provided to cover the top surface of the prism sheet 24a, i.e., provided farthest from the light exit surface 122a of the light guide plate 122. The cover glass 124 is provided to protect the prism sheet 24a, the diffusion sheet 24b, and the transmittance adjusting member 24c.

The optical member unit 130, having the same configuration as the optical member unit 124, is provided to further enhance the uniformity of the illuminating light emitted from the light exit surface 128a of the second light guide plate 128 and emit the illuminating light with thus further enhanced uniformity from the light exit surface 104b of the main body of lighting device 104. The optical member unit 130 comprises a prism sheet 130a, a diffusion sheet 130b, a transmittance adjusting member 130c, and a cover glass 130d. Since these members are the same as the counterparts of the optical member unit 124, their descriptions are not given.

With the main body of lighting device 104 having linear light sources 12 provided in the parallel grooves 122b of the first light guide plate 122, the light admitted to the first light guide plate 122 is emitted from the light exit surface 122a as uniform illuminating light. The second light guide plate 128 has linear light sources 112 in the parallel grooves 128b thereof. The light emitted from the linear light sources 112 and admitted to the second light guide plate 128 via the parallel grooves 128b of the second light guide plate 128 is emitted from the light exit surface 128a of the second light guide plate 128 as uniform illuminating light.

Thus, the light leaving the light exit surface 122a of the first light guide plate 122 passes the optical member unit 124 and is emitted from the rectangular light exit surface 122a whereas the light leaving the light exit surface 128a of the second light guide plate 128 passes the optical member unit 130 and is emitted from the rectangular light exit surface 104b.

The main body of lighting device 104 emits light from two opposite surfaces, i.e., emits light from both sides.

The housing 106 accommodates the main body of lighting device 104 and holds it from both sides thereof, i.e., from the light exit surfaces 104a and 104b. The housing 106 comprises a main body of housing 140 and a U-shaped turnup member 142 fitted between the main body of housing 140 and the main body of lighting device 104. The main body of housing 140 supports the main body of lighting device 104 such that a rectangular opening is formed on the top side of the main body of housing 140 to provide an opening 106a and a rectangular opening is formed on the bottom side of the main body of housing 140 to provide an opening 106b. The main body of housing 140 covers the lateral sides of the main body of lighting device 104 and peripheries of the light exit surfaces 104a and 104b.

The main body of lighting device 104 is supported and secured by the housing 106.

The planar lighting device being constructed in such a manner, both top and bottom sides thereof can be used as light exit surfaces. Thus, a single unit of such planar lighting device suffices for a liquid crystal display device capable of exhibiting different images on two screens. Further, the planar lighting device of the present invention can be used for a wide variety of applications other than this, including decoration lights and point-of-purchase (POP) advertising equipment.

As in the case of the planar lighting device 10, the first and the second light guide plates of the planar lighting device 50 may be fastened to each other with a fixing means.

While, in the planar lighting device 50, the reflective member is provided as a discrete member from the light guide plate, the present invention is not limited thereto. For example, the reflective member may be dispensed with altogether and, for example, white ink or other reflective material may instead be applied to the inclined surfaces of the first and the second light guide plates to form reflective films.

Since the inclined surfaces of the second light guide plate are so disposed to close the parallel grooves of the first light guide plate, the reflective films formed on the inclined surfaces of the second light guide plate act as reflector to reflect light from beneath the linear light sources. Thus, just providing the reflective films formed only on the inclined surfaces of the light guide plate suffices to achieve similar effects obtained as when the reflective material is provided. Likewise, the reflective films formed on the inclined surfaces of the first light guide plate acts as reflector by reflecting light from beneath the linear light sources, achieving similar effects as when the reflective member is provided.

While the reflective member is provided between the first and the second light guide plates in the planar lighting device 50, the reflective member need not necessarily be provided, and the second light guide plate may be disposed immediately on the rear surface of the first light guide plate. Specifically, without the reflective member between the first and the second light guide plates, the rear surfaces of the first and the second light guide plates may be placed in immediate contact with each other.

Thus, without the reflective member or the reflective film between the first and the second light guide plates, the light leaving the inclined surfaces of the first light guide plate enters the second light guide plate and the light leaving the inclined surfaces of the second light guide plate enters the first light guide plate. Thus, as the light leaving the inclined surfaces of one light guide plate is allowed to enter the other light guide plate, the light can be emitted from the light exit surfaces of the first and the second light guide plates with substantially a same efficiency as when the reflective member is provided. Without the reflective member, moreover, the whole device can be made simple in structure.

Although the planar lighting device has been described above in terms of preferred embodiments, the present invention is in no way limited to those embodiments and it is to be understood that various improvements and modifications may be made without departing from the true spirit of the invention.

What is claimed is:

1. A planar lighting device comprising:
    linear light sources arranged in parallel to each other;
    a light guide plate comprising a flat light exit surface, a rear surface opposite to said light exit surface and parallel grooves formed in said rear surface, for accommodating said linear light sources, respectively, wherein a cross-section of said light guide plate perpendicular to said parallel grooves has a rear surface profile of said rear surface such that convex portions are formed at respective portions where said parallel grooves are formed, while concave portions are formed between adjacent parallel grooves, and a thickness of said light guide plate in each concave portion decreases from each parallel groove toward either midpoint between adjacent parallel grooves and is thinnest at said midpoint; and
    a support member arranged in a side of said rear surface of said light guide plate, for supporting said light guide plate,
    wherein said support member has a first surface facing said rear surface of said light guide plate and a second surface opposite to said first surface,
    wherein a cross-section of said support member perpendicular to said parallel grooves of said light guide plate has a first surface profile of said first surface such that a portion of said first surface facing each convex portion of said rear surface profile of said light guide plate is identical to the profile of each concave portion of said rear surface profile of said light guide plate, while a profile of said second surface of said support member is identical to a profile of said flat light exit surface of said light guide, and
    wherein said support member further comprises parallel grooves formed in each of a portion of said first surface facing each concave portion of said rear surface profile of said light guide member parallel to each other, respectively, and each parallel groove of said support member has substantially a same shape as said parallel groove formed in each of said convex portions of said light guide plate;
    wherein the linear light sources are disposed within the parallel grooves formed in the light guide plate, and the parallel grooves formed in the support member are devoid of linear light sources.

2. The planar lighting device according to claim 1, wherein said support member has concave and convex portions formed on said first surface of said support member, and supports said light guide plate such that said concave and convex portions formed on said first surface of said support member fit to said respective convex and concave portions formed on said rear surface of said light guide plate.

3. The planar lighting device according to claim 1, wherein each of said rear surface profile and said first surface profile is formed that adjacent concave portions are symmetrical with respect to a convex portion formed between said first surface profile and that adjacent convex portions are symmetrical with respect to a concave portion formed between adjacent convex portions.

4. The planar lighting device according to claim 1, wherein said rear surface profile and said first surface profile are symmetrical with respect to a midpoint between said adjacent concave portions and a midpoint between convex portions.

5. The planar lighting device according to claim 1, wherein said support member is formed of a same material as said light guide plate.

6. The planar lighting device according to claim 1, wherein said support member further has a reflective film on said first surface facing the light guide plate.

7. The planar lighting device according to claim 1, wherein said light guide plate comprises a plurality of individual light guide plates, each individual light guide plate comprising:
    an individual rectangular light exit surface;
    a parallel groove formed on a surface opposite to said individual rectangular light exit surface, for accommodate a linear light source;
    a thick portion positioned at substantially a central portion of said individual rectangular light exit surface in parallel with an axis of said linear light source;
    thin end portions formed in parallel with said thick portion and at both sides of said thick portion; and
    inclined rear portions forming inclined surfaces at both side of said parallel groove,
    wherein said inclined rear portions are symmetrical with respect to a plane including an axis of said linear light source and being perpendicular to said individual rectangular light exit surface, and a thickness of said inclined rear portions decrease in a direction perpendicular to said linear light source toward said thin end portions at both ends of said individual light guide plate,
    wherein said parallel groove is formed at substantially a center of said thick portion, and
    wherein two thin end portions of adjacent individual light guide plates are connected to each other, and said individual rectangular light exit surfaces of said plurality of individual light guide plates thus connected lie on an identical plane to form said light exit surface.

8. The planar lighting device according to claim 1, further comprising: at least one optical member covering said light exit surface on a side of said light exit surface of said light guide plate.

9. The planar lighting device according to claim 8, wherein said at least one optical member comprises at least one of a prism sheet, a diffusion sheet, and a transmittance adjusting member.

10. The planar lighting device according to claim 1, further comprising: fixing members for engaging and fastening said light guide plate to said support member.

11. The planar lighting device according to claim 10, wherein said fixing members are screws or rivets fitted into said light guide plate and said support member.

12. The planar lighting device according to claim 11, wherein said fixing members have a refractive index of from 90% to 110% of the refractive index of said light guide plate.

13. The planar lighting device according to claim 11, wherein said fixing members have substantially a same refractive index as said light guide plate.

14. The planar lighting device according to claim 10, further comprising: holding members disposed on said flat surface of said support member.

15. The planar lighting device according to claim 1, wherein said support member is manufactured under same manufacturing conditions as said light guide plate.

16. The planar lighting device according to claim 1, wherein the device is a single sided light emitting device.

17. A planar lighting device comprising:

linear light sources arranged in parallel to each other;

a light guide plate comprising a flat light exit surface, a rear surface opposite to said light exit surface and parallel grooves formed in said rear surface, for accommodating said linear light sources, respectively, wherein a cross-section of said light guide plate perpendicular to said parallel grooves has a rear surface profile of said rear surface such that convex portions are formed at respective portions where said parallel grooves are formed, while concave portions are formed between adjacent parallel grooves, and a thickness of said light guide plate in each concave portion decreases from each parallel groove toward either midpoint between adjacent parallel grooves and is thinnest at said midpoint; and a support member arranged in a side of said rear surface of said light guide plate, for supporting said light guide plate, wherein said support member has a first surface facing said rear surface of said light guide plate and a second surface opposite to said first surface, and wherein a cross-section of said support member perpendicular to said parallel grooves of said light guide plate has a first surface profile of said first surface such that a portion of said first surface facing each convex portion of said rear surface profile of said light guide plate is identical to the profile of each concave portion of said rear surface profile of said light guide plate, while a profile of said second surface of said support member is identical to a profile of said flat light exit surface of said light guide;

wherein said support member further comprises parallel grooves formed in each of a portion of said first surface facing each concave portion of said rear surface profile of said light guide member; and wherein the linear light sources are disposed within the parallel grooves formed in the light guide plate, and the parallel grooves formed in the support member are devoid of linear light sources.

18. A planar lighting device comprising:

linear light sources arranged in parallel to each other;

a light guide plate comprising a flat light exit surface, a rear surface opposite to said light exit surface and parallel grooves formed in said rear surface, for accommodating said linear light sources, respectively, wherein a cross-section of said light guide plate perpendicular to said parallel grooves has a rear surface profile of said rear surface such that convex portions are formed at respective portions where said parallel grooves are formed, while concave portions are formed between adjacent parallel grooves, and a thickness of said light guide plate in each concave portion decreases from each parallel groove toward either midpoint between adjacent parallel grooves and is thinnest at said midpoint; and a support member arranged in a side of said rear surface of said light guide plate, for supporting said light guide plate, wherein said support member has a first surface facing said rear surface of said light guide plate and a second surface opposite to said first surface, and wherein a cross-section of said support member perpendicular to said parallel grooves of said light guide plate has a first surface profile of said first surface such that a portion of said first surface facing each convex portion of said rear surface profile of said light guide plate is identical to the profile of each concave portion of said rear surface profile of said light guide plate, while a profile of said second surface of said support member is identical to a profile of said flat light exit surface of said light guide;

wherein said light guide plate comprises a plurality of individual light guide plates, each individual light plate comprising:

an individual rectangular light exit surface;

a thick portion positioned at substantially a central portion of said individual rectangular light exit surface in parallel with an axis of said linear light source; and thin end portions formed in parallel with said thick portion and at both sides of said thick portion, wherein said parallel groove is formed at substantially a center of said thick portion, wherein said support member comprises a plurality of repeat units, each of the plurality of repeat units comprising:

an individual rectangular flat surface;

a thick portion positioned at substantially a central portion of said individual rectangular flat surface in parallel with an axis of said linear light source; and thin end portions formed in parallel with said thick portion and at both sides of said thick portion, wherein said parallel groove is formed at substantially a center of said thick portion, wherein a configuration of said repeat unit is the same as a configuration of said individual light guide plates; and wherein the linear light sources are disposed within the parallel grooves formed in the light guide plate, and the parallel grooves formed in the support member are devoid of linear light sources.

* * * * *